US007964522B2

(12) United States Patent
Moore et al.

(10) Patent No.: US 7,964,522 B2
(45) Date of Patent: Jun. 21, 2011

(54) F-DOPED SILICA GLASS AND PROCESS OF MAKING SAME

(75) Inventors: Lisa Anne Moore, Corning, NY (US); Charlene Marie Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 879 days.

(21) Appl. No.: 11/891,984

(22) Filed: Aug. 14, 2007

(65) Prior Publication Data

US 2008/0053150 A1 Mar. 6, 2008

Related U.S. Application Data

(60) Provisional application No. 60/841,448, filed on Aug. 31, 2006.

(51) Int. Cl.
- *C03C 3/06* (2006.01)
- *C03C 3/112* (2006.01)
- *C03B 19/06* (2006.01)
- *C03B 15/00* (2006.01)
- *C03B 32/00* (2006.01)
- *C03B 17/00* (2006.01)

(52) U.S. Cl. ........... 501/54; 501/57; 65/30.1; 65/111; 65/17.4

(58) Field of Classification Search ........... 501/53, 501/54, 57; 65/17.4, 30.1, 111
See application file for complete search history.

(56) References Cited

U.S. PATENT DOCUMENTS

| | | | |
|---|---|---|---|
| 5,326,729 A | 7/1994 | Yaba et al. | 501/54 |
| 5,679,125 A | 10/1997 | Hiraiwa et al. | 65/397 |
| 6,451,719 B1 * | 9/2002 | Yamagata | 501/54 |
| 6,473,227 B1 | 10/2002 | Yamagata | 359/361 |
| 6,499,317 B1 | 12/2002 | Ikuta et al. | 65/378 |
| 6,576,578 B1 | 6/2003 | Ikuta et al. | 501/54 |
| 6,619,073 B2 * | 9/2003 | Borrelli et al. | 65/30.1 |
| 6,782,716 B2 * | 8/2004 | Moore et al. | 65/30.1 |
| 6,817,211 B2 | 11/2004 | Brown et al. | 65/17.4 |
| 6,954,256 B2 * | 10/2005 | Flagello et al. | 355/53 |
| 2002/0151425 A1 * | 10/2002 | Fujinoki et al. | 501/54 |
| 2003/0096693 A1 | 5/2003 | Ohga et al. | 501/54 |
| 2005/0112380 A1 | 5/2005 | Boek et al. | 428/432 |
| 2006/0183622 A1 | 8/2006 | Nishimura et al. | 501/54 |
| 2006/0234848 A1 | 10/2006 | Kuehn et al. | 501/54 |
| 2007/0105703 A1 * | 5/2007 | Bookbinder et al. | 501/54 |

(Continued)

FOREIGN PATENT DOCUMENTS

EP 1 094 040 2/2007

(Continued)

OTHER PUBLICATIONS

C. M. Smith, N.F. Borrelli, and R. J. Araujo, Appl. Opt. 39, 5778, 2000.

(Continued)

*Primary Examiner* — Jerry Lorengo
*Assistant Examiner* — Noah S Wiese
(74) *Attorney, Agent, or Firm* — Siwen Chen; Robert P. Santandrea

(57) ABSTRACT

An F-doped silica glass, a process for making the glass, an optical member comprising the glass, and an optical system comprising such optical member. The glass material comprises 0.1-5000 ppm by weight of fluorine. The glass material according to certain embodiments of the present invention has low polarization-induced birefringence, low LIWFD and low induced absorption at 193 nm.

24 Claims, 8 Drawing Sheets

U.S. PATENT DOCUMENTS

2007/0105704 A1* 5/2007 Bookbinder et al. ............ 501/54

FOREIGN PATENT DOCUMENTS

| | | |
|---|---|---|
| JP | 2000-239040 | 9/2000 |
| JP | 2001-180956 | 7/2001 |
| JP | 2001-302275 | 10/2001 |
| JP | 2002-12441 | 1/2002 |
| JP | 2002/87840 | 3/2002 |
| JP | 2002-128536 | 5/2002 |
| JP | 2002-220253 | 8/2002 |
| JP | 2005-67913 | 2/2005 |
| JP | 2005-215318 | 8/2005 |
| WO | 2005/059972 | 6/2005 |
| WO | 2005/105685 | 11/2005 |

OTHER PUBLICATIONS

R. J. Araujo, N.F. Borrelli, C.M. Smith SPIE Proc. vol. 3424, 25, 1998.

D. Allan, N. Borrelli, C. Heckle, M. Mlejnek, J. Moll, C. Smith "Laser Induced Birefingence in Fused Silica from Polarized Lasers," Published in Optical Microlithography XVII, Proc. SPIE 5754, 638-645 (2005).

B. Kuhn, S. Kaiser, I. Radosevic, B. Uebbing, S. Thomas, "Synthetic Fused Silica Tailored for 193nm Immersion Lithography" presented at the Sematech $2^{nd}$ International Symposium on Immersion Lithography, Sep. 12-15, 2005 ruges, Belgium.

CM Smith N. F. Borrelli, JOSA B 2006, in press.

* cited by examiner

F-DOPED SILICA GLASS AND PROCESS OF MAKING SAME

CROSS-REFERENCE TO RELATED APPLICATIONS

The present application claims priority to U.S. Provisional Patent Application Ser. No. 60/841,448, filed on Aug. 31, 2006 and entitled "F-DOPED SILICA GLASS AND PROCESS OF MAKING SAME," the content of which is relied upon and incorporated herein by reference in its entirety.

TECHNICAL FIELD

The present invention relates to silica glass and process for making the same. In particular, the present invention relates to F-doped synthetic silica glass and processes for making the same. The present invention is useful, for example, in making high purity synthetic silica glass that can be used in the optical elements of lithographic devices operating at a wavelength of below about 300 nm, such as at about 193 nm.

BACKGROUND

High purity fused silica glass has found use in optics of many devices due to its excellent performances and properties, such as optical transmission, thermal expansion, and the like. Particularly, in the area of state-of-the-art deep UV and vacuum UV projection lithography, high purity synthetic silica glass has become the material of choice because other glass materials otherwise useable at longer wavelength are disqualified.

The desire of higher resolution in microlithography in the semiconductor chip industry has placed more stringent requirements on the properties and performances of the materials used in the optics in manipulating the lithographic irradiations. Such critical properties for the silica glasses used in projection lithography used in ArF excimer laser microlithography include, but are not limited to, static properties such as initial internal transmission, refractive index homogeneity, initial birefringence, fictive temperature, and the like, but also dynamic properties in response to laser exposure such as light induced wavefront distortion (LIWFD), light induced birefringence, fluence-dependent transmission (FDT), induced absorption (IA), and the like.

Recently, with the advent of immersion lithography, in which polarized UV irradiation is used, research results on behavior of silica glass material when exposed to polarized light have been published. It was found that for certain silica glasses, for reasons not well understood, tends to suffer from a problem we call polarization-induced birefringence (PIB). Particularly, if the glass is exposed to linearly polarized light, birefringence is produced in the exposed area. When the material develops PIB there is undesirable modification of the incident exposing light, leading to image distortion.

Therefore, there is a genuine need of a silica glass material suitable for lithography applications operating at below about 300 nm, such as at about 248 and 193 nm, which demonstrates lower polarization-induced birefringence than existing materials, or better yet, essentially no polarization-induced birefringence.

SUMMARY

A first aspect of the present invention is an F-doped synthetic silica glass material capable of being used in the light path of the lithographic irradiation of a lithographic device operating at a wavelength below about 300 nm, comprising, by weight of the glass:

less than 50 ppm of Cl;
less than 50 ppb of Na;
less than 50 ppb in total of transition metals; and
from 0.1 ppm to 5000 ppm of fluorine (in certain embodiments from 1 to 3000 ppm, in certain other embodiments from 1 to 2000 ppm, in certain other embodiments from 1 to 1000 ppm, in certain other embodiments from 1 to 800 ppm, in certain other embodiments from 1 to 500 ppm, in certain other embodiments from 1 to 300 ppm, in certain embodiments from 1 to 150 ppm, in certain embodiments from 1 to 50 ppm); and having a polarization-induced birefringence of lower than 7 nm/mm (in certain embodiments lower than 5 nm/mm, in certain embodiments lower than 1 nm/mm, in certain embodiments less than 0.1 nm/mm), measured at 633 nm after being subjected to 10 million pulses of linearly polarized pulsed laser beam at 157 nm having a fluence of $250\,\mu J \cdot cm^{-2} \cdot pulse^{-1}$ and a pulse length of 30 ns.

According to certain embodiments of the F-doped synthetic silica glass material of the present invention, the material is further doped with other dopants.

According to certain embodiments of the F-doped synthetic silica glass material of the present invention, the material comprises less than 500 ppm of OH and OD in combination by weight of the glass, in certain embodiments less than 300 ppm, in certain embodiments less than 200 ppm, in certain embodiments less than 100 ppm, in certain embodiments less than 50 ppm, in certain embodiments less than 30 ppm, in certain embodiments less than 10 ppm, in certain embodiments less than 1 ppm, in certain embodiments less than 0.1 ppm.

According to certain embodiments of the F-doped synthetic silica glass material of the present invention, the material comprises less than 30 ppm by weight of the glass of Cl, in certain embodiments less than 20 ppm, in certain embodiments less than 10 ppm, in certain embodiments less than 5 ppm, in certain embodiments less than 1 ppm.

According to certain embodiments of the F-doped synthetic silica glass material of the present invention, the material comprises less than 30 ppb Na by weight of the glass, in certain embodiments less than 20 ppb, in certain embodiments less than 10 ppb, in certain embodiments less than 5 ppb, in certain embodiments less than 1 ppb.

According to certain embodiments of the F-doped synthetic silica glass material of the present invention, the material comprises less than 50 ppb in total of alkali metal by weight of the glass, in certain embodiments less than 30 ppb, in certain embodiments less than 20 ppb, in certain embodiments less than 10 ppb, in certain embodiments less than 5 ppb, in certain embodiments less than 1 ppb.

According to certain embodiments of the F-doped synthetic silica glass material of the present invention, the material comprises less than 30 ppb in total of transition metals by weight of the glass, in certain embodiments less than 20 ppb, in certain embodiments less than 10 ppb, in certain embodiments less than 5 ppb, in certain embodiments less than 1 ppb.

According to certain embodiments of the F-doped synthetic silica glass material of the present invention, the material comprises less than $5E19$ molecules/cm$^3$ of hydrogen, in certain embodiments less than $1E19$ molecules/cm$^3$, in certain embodiments less than $5E18$ molecules/cm$^3$, in certain embodiments less than $1E18$ molecules/cm$^3$, in certain embodiments less than $5E17$ molecules/cm$^3$, in certain embodiments less than $1E17$ molecules/cm$^3$, in certain embodiments less than 5E16 molecules/cm$^3$, in certain embodiments less than 1E16 molecules/cm$^3$, in certain embodiments from 1E16 to 5E17 molecules/cm$^3$, in certain embodiments from 1E16 to 2E17 molecules/cm$^3$.

According to certain embodiments of the F-doped synthetic silica glass material of the present invention, the material is essentially free of loaded hydrogen gas molecules.

According to certain embodiments of the F-doped synthetic silica glass material of the present invention, the material has an induced absorption, measured at 215 nm, of less than 0.1 cm$^{-1}$ after exposure to 3M (3 million) pulses of excimer laser at 193 nm at a fluence of 25 mJ·cm$^{-2}$·pulse$^{-1}$ and a pulse length of 30 ns, in certain embodiments less than 0.05 cm$^{-1}$, in certain other embodiments less than 0.03 cm$^{-1}$, in certain other embodiments less than 0.01 cm$^{-1}$, in certain embodiments less than 0.005 cm$^{-1}$, in certain embodiments less than 0.003 cm$^{-1}$.

According to certain embodiments of the F-doped synthetic silica glass material of the present invention, the material has an induced absorption, measured at 215 nm, of less than 0.1 cm$^{-1}$ after exposure to 10M (10 million) pulses of excimer laser at 193 nm at a fluence of 25 mJ·cm$^{-2}$·pulse$^{-1}$ and a pulse length of 30 ns, in certain embodiments less than 0.05 cm$^{-1}$, in certain other embodiments less than 0.03 cm$^{-1}$, in certain other embodiments less than 0.01 cm$^{-1}$, in certain embodiments less than 0.005 cm$^{-1}$, in certain embodiments less than 0.003 cm$^{-1}$.

According to certain embodiments of the F-doped synthetic silica glass material of the present invention, the material has an initial internal transmission at 193 nm of at least 99.50%/cm, in certain embodiments of at least 99.60%/cm, in certain embodiments of at least 99.65%/cm, in certain embodiments at least 99.70%/cm, in certain embodiments at least 99.75%/cm.

According to certain embodiments of the F-doped synthetic silica glass material of the present invention, the material has a transmission at 157 nm of at least 25%/cm, in certain embodiments at least 30%/cm, in certain embodiments at least 40%/cm, in certain embodiments at least 50%/cm, in certain embodiments at least 60%/cm, in certain embodiments at least 70%/cm, in certain embodiments at least 75%/cm, in certain embodiments at least 78%/cm.

According to certain embodiments of the F-doped synthetic silica glass material of the present invention, the material is essentially free of OH, OD and Cl.

According to certain embodiments of the F-doped synthetic silica glass material of the present invention, the material has an LIWFD, measured at 633 nm (LB633), from 0 to 1.5 nm/cm (in certain embodiments from 0 to 1.25 nm/cm, in certain embodiments from 0 to 1.0 nm/cm, in certain other embodiments from 0 to 0.5 nm/cm) at a dose $$\left(N' \cdot \frac{F^2}{\tau}\right)^{0.6}$$

of 6, where N'=1375 is number of pulses in millions of the linearly polarized ArF excimer laser to which the sample was exposed to when the LB633 is measured, F=0.6 is the fluence of the ArF excimer laser in mJ·cm$^{-2}$·pulse$^{-1}$, and τ=25 is pulse length of the ArF excimer laser in ns.

In certain preferred embodiments of the F-doped synthetic silica glass of the present invention, the glass exhibits a light-induced wavefront distortion (LIWFD), measured at 193 nm (LB193), from 0 to 2.5 nm/cm (in certain embodiments from 0 to 2.2 nm/cm, in certain embodiments from 0 to 1.5 nm/cm, in certain embodiments from 0 to 1.0 nm/cm, in certain other embodiments from 0 to 0.5 nm/cm) at a dose $$\left(N' \cdot \frac{F^2}{\tau}\right)^{0.6}$$

of 6, where N'=1375 is number of pulses in millions of the linearly polarized ArF excimer laser to which the sample was exposed to when the LB193 is measured, F=0.6 is the fluence of the ArF excimer laser in mJ·cm$^{-2}$·pulse$^{-1}$, and τ=25 is pulse length of the ArF excimer laser in ns.

According to certain embodiments of the F-doped synthetic silica glass material of the present invention, the material is further doped with OD at a level of higher than 1 ppm by weight of the glass, but not higher than 500 ppm, in certain embodiments not higher than 300 ppm, in certain other embodiments not higher than 200 ppm, in certain embodiments not higher than 150 ppm, in certain embodiments not higher than 100 ppm, in certain embodiments not higher than 80 ppm, in certain embodiments not higher than 50 ppm, in certain embodiments not higher than 30 ppm, in certain embodiments not higher than 10 ppm.

According to certain embodiments of the F-doped synthetic silica glass material of the present invention, the material has a fictive temperature of lower than 1150° C., in certain embodiments lower than 1100° C., in certain other embodiments lower than 1050° C., in certain embodiments lower than 1000° C.

According to certain embodiments of the F-doped synthetic silica glass material of the present invention, the material has a refractive index variation measured in a plane perpendicular to at least one direction of less than 10 ppm, in certain embodiments less than 5 ppm, in certain embodiments less than 1 ppm, in certain embodiments less than 0.5 ppm.

According to certain embodiments of the F-doped synthetic silica glass material of the present invention, the material has a concentration variation of OH and OD ([OH]+[OD]) measured in a plane perpendicular to at least one direction of less than 100 ppm, in certain embodiments less than 50 ppm, in certain embodiments less than 30 ppm, in certain embodiments less than 10 ppm.

According to certain embodiments of the F-doped synthetic silica glass material of the present invention, the material has a concentration variation of F ([F]) measured in a plane perpendicular to at least one direction of less than 100 ppm, in certain embodiments less than 50 ppm, in certain embodiments less than 30 ppm, in certain embodiments less than 10 ppm, in certain embodiments less than 5 ppm.

According to certain embodiments of the F-doped synthetic silica glass material of the present invention, the material has a concentration variation of fluorine, OH and OD ([OH]+[OD]+[F]) measured in a plane perpendicular to at least one direction of less than 100 ppm, in certain embodiments less than 50 ppm, in certain embodiments less than 30 ppm, in certain embodiments less than 10 ppm, in certain embodiments less than 5 ppm.

According to certain embodiments of the F-doped synthetic silica glass material of the present invention, the ratio of concentration of OD ([OD]) to the concentration of OH ([OH]) in different locations in the material, i.e., [OD]/[OH], is essentially constant.

A second aspect of the present invention relates to an optical member for use in the optical path of irradiation having a wavelength shorter than 300 nm, consisting essentially of a synthetic silica glass material described summarily supra.

According to certain embodiments of the optical member of the present invention, the optical member is for use in the optical path of irradiation having a wavelength shorter than 300 nm and a fluence over 0.5 mJ·cm$^{-2}$·pulse$^{-1}$, in certain embodiments over 1 mJ·cm$^{-2}$·pulse$^{-1}$, in certain embodiments over 5 mJ·cm$^{-2}$·pulse$^{-1}$, in certain other embodiments over 10 mJ·cm$^{-2}$·pulse$^{-1}$, in certain other embodiments over 20 mJ·cm$^{-2}$·pulse$^{-1}$, in certain other embodiments over 50 mJ·cm$^{-2}$·pulse$^{-1}$, in certain other embodiments over 100 mJ·cm$^{-2}$·pulse$^{-1}$.

A third aspect of the present invention relates to a lithographic system comprising at least one optical member described summarily supra.

According to certain embodiments of the lithographic system of the present invention, the system operates at a wavelength of below 300 nm.

According to certain embodiments of the lithographic system of the present invention, the system is an immersion lithographic system.

A fourth aspect of the present invention relates to a process for making F-doped synthetic silica glass material capable of being used in the light path of the lithographic irradiation of a lithographic device operating at a wavelength below 300 nm, comprising the following steps:

(I) providing a plurality of particles comprising silica;

(II) depositing the plurality of particles on a supportive deposition surface at an elevated temperature such that the particles are consolidated into transparent glass material in situ, wherein:

either in step (I), the plurality of particles provided are F-containing, and/or in step (II), the deposition and consolidation are carried out in an F-containing atmosphere, such that the obtained silica glass comprises, by weight of the glass:

less than 50 ppm of Cl;
less than 50 ppb of Na;
less than 50 ppb in total of transition metals; and
from 0.1 ppm to 5000 ppm of fluorine (in certain embodiments from 1 to 3000 ppm, in certain other embodiments from 1 to 2000 ppm, in certain other embodiments from 1 to 1000 ppm, in certain other embodiments from 1 to 800 ppm, in certain other embodiments from 1 to 500 ppm, in certain other embodiments from 1 to 300 ppm, in certain embodiments from 1 to 150 ppm, in certain embodiments from 1 to 50 ppm); and has a polarization-induced birefringence of lower than 7 nm/mm (in certain embodiments lower than 5 nm/mm, in certain embodiments lower than 1 nm/mm, in certain embodiments less than 0.1 nm/mm), measured at 633 nm after being subjected to 10 million pulses of linearly polarized pulsed laser beam at 157 nm having a fluence of 250 μJ·cm$^{-2}$·pulse$^{-1}$ and a pulse length of 30 ns.

According to certain embodiments of the process of the fourth aspect of the present invention, in step (I), the particles are generated by flame hydrolysis of at least one Si-containing precursor compound.

According to certain embodiments of the process of the fourth aspect of the present invention, in step (I), the Si-containing precursor compound is selected from organosilicon compounds and silicon halides.

According to certain embodiments of the process of the fourth aspect of the present invention, in step (II), the deposition is initiated on an essentially planar top surface of a horizontally rotating table.

According to certain embodiments of the process of the fourth aspect of the present invention, in step (I), the particles are provided via a plasma-assisted process.

According to certain embodiments of the process of the fourth aspect of the present invention, the process further comprises comprising the following step (III):

(III) treating the consolidated glass obtained in step (II) in an atmosphere comprising H$_2$ and/or HD and/or D$_2$. In certain embodiments, in this step (III), the treatment temperature is lower than 600° C. In certain other embodiments, in this step (III), the treatment temperature is higher than 600° C. In certain embodiments, in this step (III), the treatment time and temperature is chosen such that the sum total of the concentration of H$_2$, HD and D$_2$ in the treated glass is between 0.5E16 to 5E19 molecules/cm$^3$.

Subsequent to step (II), before or after step (III), the glass may be subject to heat treatment (such as annealing).

According to certain embodiments of the process of the fourth aspect of the present invention, in step (I), particles comprising dopants are provided and mixed with the particles comprising silica. In certain embodiments, the particles comprising dopants comprise at least one of Cl, TiO$_2$ and Al$_2$O$_3$.

A fifth aspect of the present invention relates to a process for making F-doped synthetic silica glass material capable of being used in the light path of the lithographic irradiation of a lithographic device operating at a wavelength below 300 nm, comprising, by weight of the glass:

less than 50 ppm of Cl;
less than 50 ppb of Na;
less than 50 ppb in total of transition metals; and
from 0.1 ppm to 5000 ppm of fluorine (in certain embodiments from 1 to 3000 ppm, in certain other embodiments from 1 to 2000 ppm, in certain other embodiments from 1 to 1000 ppm, in certain other embodiments from 1 to 800 ppm, in certain other embodiments from 1 to 500 ppm, in certain other embodiments from 1 to 300 ppm, in certain embodiments from 1 to 150 ppm, in certain embodiments from 1 to 50 ppm); and having a polarization-induced birefringence of lower than 7 nm/mm (in certain embodiments lower than 5 nm/mm, in certain embodiments lower than 1 nm/mm, in certain embodiments less than 0.1 nm/mm), measured at 633 nm after being subjected to 10 million pulses of linearly polarized pulsed laser beam at 157 nm having a fluence of 250 μJ·cm$^{-2}$·pulse$^{-1}$ and a pulse length of 30 ns, comprising the following steps:

(A) providing a particle preform comprising a plurality of particles comprising silica;

(B) optionally purifying and/or drying the particle preform;

(C) optionally further doping the particle preform with dopants;

(D) consolidating the particle preform at an elevated temperature to densified glass; and (E) optionally treating the consolidated glass obtained in step (D) in the presence of H$_2$, HD and/or D$_2$, wherein in at least one of steps (A), (B), (C) and (D), F is introduced or formed into the glass such that the resultant glass comprises F from 0.1 to 5000 ppm by weight of the glass. According to certain embodiments of the process of the fifth aspect of the present invention, after step (D), before or after step (E), the glass may be subjected to a heat treatment (such as an annealing step).

According to certain embodiments of the process of the fifth aspect of the present invention, the soot preform provided in step (A) comprises sodium lower than 50 ppb by weight.

According to certain embodiments of the process of the fifth aspect of the present invention:

the soot preform provided in step (A) comprises sodium higher than 50 ppb by weight;

step (B) is carried out subsequent to step (A); and upon completion of step (B), the soot preform comprises sodium less than 50 ppb by weight.

According to certain embodiments of the process of the fifth aspect of the present invention, step (A) comprises the following steps:

(A1) providing a plurality of particles; and (A2) depositing the particles on a rotating supporting surface to form the particle preform.

According to certain embodiments of the process of the fifth aspect of the present invention, in step (A1), the particles are provided by (A1.1) flame hydrolysis of at least one silicon-containing precursor compound, which may be plasma-assisted.

According to certain embodiments of the process of the fifth aspect of the present invention, in step (A2), the deposition involves a process selected from (A2.1) outside vapor deposition; (A2.2) inside vapor deposition; (A2.3) vapor axial deposition; and (A2.4) planar deposition.

According to certain embodiments of the process of the fifth aspect of the present invention, step (A) comprises the following steps:

(A(i)) forming a sol-gel comprising silica; and (A(ii)) forming the particle preform from the sol-gel.

According to certain embodiments of the process of the fifth aspect of the present invention, step (A(i)) is carried out in the presence of an F-containing compound.

According to certain embodiments of the process of the fifth aspect of the present invention, step (B) is carried out and such step is carried out in an atmosphere comprising at least one purifying/drying agent selected from $F_2$, $Cl_2$, $Br_2$, a halogen-containing compound, CO, $CO_2$, and compatible mixtures thereof In certain embodiments, the halogen-containing compound is selected from HX, $COX_2$, $SOX_2$, $CX_4$, $SiX_4$, and $SX_6$, wherein X is selected from F, Cl, Br and combinations thereof.

According to certain embodiments of the process of the fifth aspect of the present invention, step (B) is carried out in an atmosphere comprising $Cl_2$, $Br_2$ or mixtures thereof.

According to certain embodiments of the process of the fifth aspect of the present invention, immediately after step (B), the particle preform has an [OH]+[OD] less than 50 ppm by weight of the total composition.

According to certain embodiments of the process of the fifth aspect of the present invention, step (C) is carried out, and such step is carried out in the presence of an atmosphere comprising dopant(s). In certain specific embodiments, step (C) is carried out in the presence of an F-containing compound such that F is doped into the glass.

According to certain embodiments of the process of the fifth aspect of the present invention, step (C) is carried out in the presence of a D-containing compound.

According to certain embodiments of the process of the fifth aspect of the present invention, step (C) is carried out in the presence of $D_2O$, $D_2$ or both.

According to certain embodiments of the process of the fifth aspect of the present invention, in step (C) exchange of OD for OH is carried out.

According to certain embodiments of the process of the fifth aspect of the present invention, if step (B) or step (C) is carried out, at least one of these two steps is carried out in the presence of a reductive atmosphere.

According to certain embodiments of the process of the fifth aspect of the present invention, the reductive atmosphere in which step (B) or step (C) is carried out comprises a gas selected from $H_2$, $D_2$, HD, hydrocarbons, D-containing hydrocarbons, and the like.

According to certain embodiments of the process of the fifth aspect of the present invention, after step (B) or step (C), if carried out, and whichever is later, an oxidation step (C(A)) is carried out wherein the particle preform is subjected to an oxidative atmosphere in which oxygen-deficient sites in the particle preform can be healed. In certain embodiments, step (C(A)) is at least part of step (D). In certain embodiments, the oxidative atmosphere in step (C(A)) comprises $H_2O$, $D_2O$, $O_2$ and/or $O_3$.

According to certain embodiments of the process of the fifth aspect of the present invention, steps (B) and (C) are carried out at least partially simultaneously.

According to certain embodiments of the process of the fifth aspect of the present invention, steps (C) and (D) are carried out at least partially simultaneously.

According to certain embodiments of the process of the fifth aspect of the present invention, steps (B) and (C) are carried out in an atmosphere comprising F-containing compound.

According to certain embodiments of the process of the fifth aspect of the present invention, steps (B) and (C) are carried out in an atmosphere without the presence of halogen other than fluorine.

According to certain embodiments of the process of the fifth aspect of the present invention, step (D) is carried out in an atmosphere comprising at least one F-containing compound.

According to certain embodiments of the process of the fifth aspect of the present invention, step (D) is carried out in an atmosphere comprising He, or other inert gas such as nitrogen.

According to certain embodiments of the process of the fifth aspect of the present invention, step (D) is carried out in an atmosphere comprising $O_2$.

According to certain embodiments of the process of the fifth aspect of the present invention, step (D) is carried out in the presence of $H_2O$.

According to certain embodiments of the process of the fifth aspect of the present invention, step (D) is carried out in the presence of $D_2O$.

According to certain embodiments of the process of the fifth aspect of the present invention, step (D) is carried out in an atmosphere essentially free of $H_2O$ and HDO.

According to certain embodiments of the process of the fifth aspect of the present invention, step (D) is carried out in the presence of $D_2$, HD or both.

According to certain embodiments of the process of the fifth aspect of the present invention, step (E) is carried out, and such step (E) is carried out in the presence of $H_2$.

According to certain embodiments of the process of the fifth aspect of the present invention, step (E) is carried out in an atmosphere essentially devoid of $D_2$ and HD.

According to certain embodiments of the process of the fifth aspect of the present invention, step (E) is carried out at a temperature lower than 600° C.

According to certain embodiments of the process of the fifth aspect of the present invention, step (E) is carried out in an atmosphere essentially devoid of $H_2$.

According to certain embodiments of the process of the fifth aspect of the present invention, step (E) is carried out in an atmosphere essentially devoid of HD and $H_2$.

According to certain embodiments of the process of the fifth aspect of the present invention, step (E) is carried out at a temperature higher than 600° C.

A sixth aspect of the present invention relates to a process for making F-doped synthetic silica glass capable of being used in the light path of the lithographic irradiation of a lithographic device operating at a wavelength below 300 nm, comprising the following steps:

(a) providing a plurality of F-doped particles comprising silica; and (b) melting the particles at an elevated temperature to obtain a transparent glass.

According to certain embodiments of the process of the sixth aspect of the present invention, step (a) comprises the following steps:

(a1) generating a plurality of particles comprising silica;
(a2) optionally purifying and/or drying the particles;
(a3) optionally doping the particles, and
(a4) optionally treating the particles in an oxidative atmosphere to at least partly heal oxygen-deficient sites in the particles.

According to certain embodiments of the process of the sixth aspect of the present invention, step (a) involves flame hydrolysis of a Si-containing precursor compound.

According to certain embodiments of the process of the sixth aspect of the present invention, step (a) involves a sol-gel process of a Si-containing compound.

According to certain embodiments of the process of the sixth aspect of the present invention, in step (b), the melted glass is also homogenized.

According to certain embodiments of the process of the sixth aspect of the present invention, the process further comprises the following step (c) after step (b):

(c) treating the glass in an atmosphere comprising $H_2$, $D_2$ and/or HD.

According to certain embodiments of the process of the sixth aspect of the present invention, after step (b), before or after step (c), the glass may be subject to a heat treatment (such as annealing).

A seventh aspect of the present invention relates to a particle preform formed during a process according to the fourth aspect of the present invention, described summarily supra, before consolidation thereof.

According to certain embodiments of the particle preform of the seventh aspect of the present invention, the preform is formed by any of the following methods: (I) outside vapor deposition; (II) inside vapor deposition; (III) vapor axial deposition (VAD); and (IV) planar deposition.

An eighth aspect of the present invention relates to a process for making F-doped synthetic silica glass capable of being used in the light path of the lithographic irradiation of a lithographic device operating at a wavelength below 300 nm, comprising the following steps:

(a) providing at least one consolidated F-doped silica glass;

(b) melting the F-doped silica glass and homogenizing it at an elevated temperature to obtain a glass having an essentially uniformly distributed [F] therein.

According to certain embodiments of the process of the eighth aspect of the present invention:

in step (a), at least two F-doped silica glasses having differing [F] are provided; and in step (b), the at least two silica glasses are mixed and homogenized.

Certain embodiments of the present invention have one or more of the following advantages. First, the F-doped silica glass of certain embodiments of the present invention has low polarization-induced birefringence at both 193 nm and 157 nm. Second, the F-doped silica glass of certain embodiments of the present invention has low induced absorption upon exposure to 193 excimer laser.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION

Figure 1:
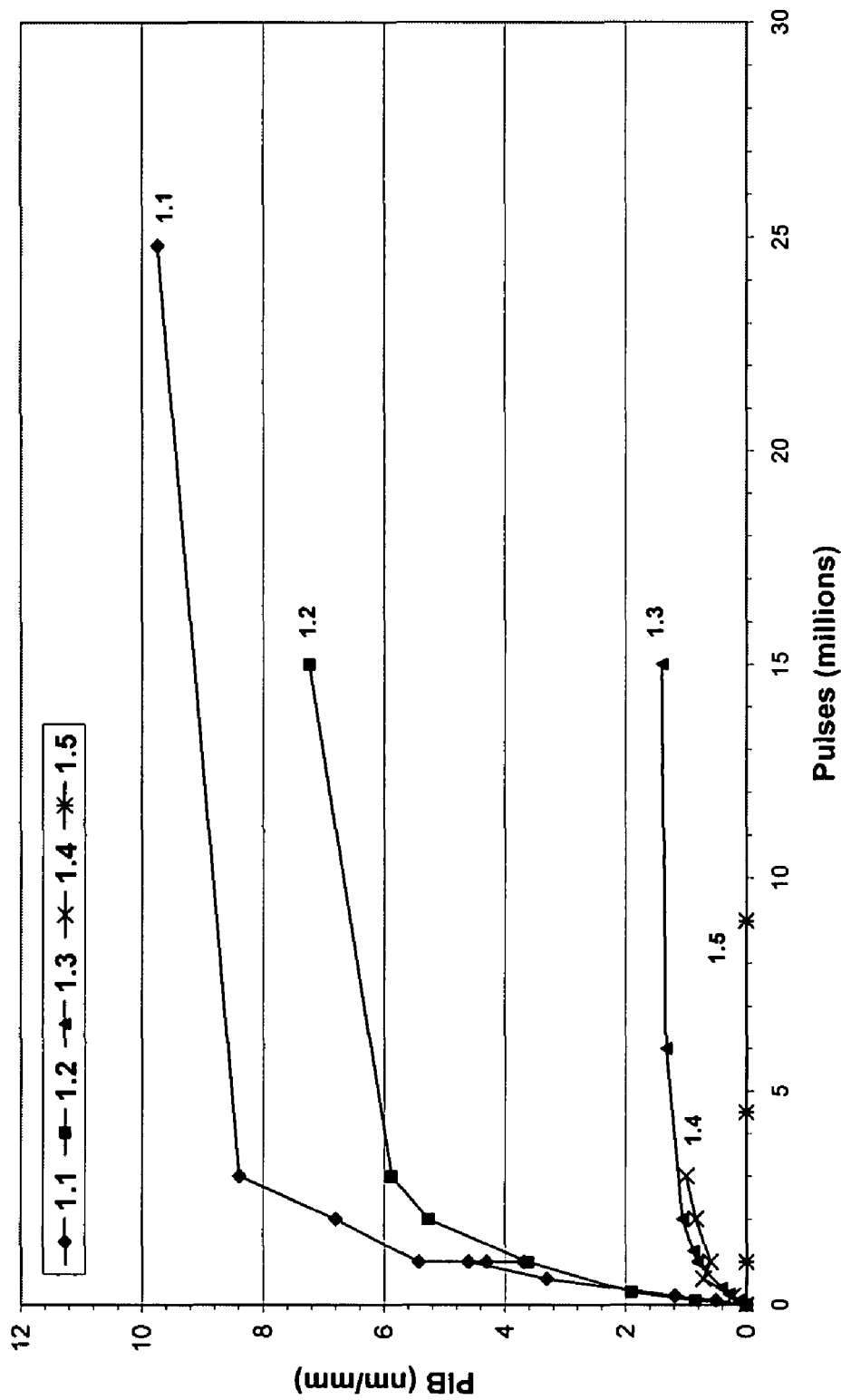
FIG. 1 is a diagram showing polarization-induced birefringence (PIB) vs. exposure pulses in millions for different silica glasses exposed to linearly polarized $F_2$ excimer laser light.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a lens element" includes embodiments having two or more such lens elements, unless the context clearly indicates otherwise.

As used herein, a "wt %" or "weight percent" or "percent by weight" of a component, unless specifically stated to the contrary, is based on the total weight of the composition or article in which the component is included. As used herein, all percentages are by weight unless indicated otherwise.

As used herein, the term "D-containing compound" means a chemical compound or an elemental substance comprising deuterium atom(s) ($_1^2H$ or $_1^2D$, "D") and optionally protium atom(s) ($_1^1H$, "H"), in which the ratio of n(D)/(n(D)+n(H)) is higher than the natural isotopic abundance of D, where n(D) is the total number of D atoms in the molecule of the D-containing compound, and n(H) is the total number of H atoms in the molecule of the D-containing compound. Examples of D-containing compound thus include, but are not limited to: $D_2$, DH, $CD_4$, $CDH_3$, $D_2O$, DHO, and the like. As used herein, the term "D-containing" means that an elemental substance, a compound, a material, or an atmosphere in which the ratio of n(D)/(n(D)+n(H)) is higher than the natural isotopic abundance of D.

As used herein, the term "hydroxyl(s)" or OH means a moiety or a group of moieties each consisting of an oxygen atom and a protium atom (H). The oxygen atom may be $^{16}O$, $^{17}O$ or $^{18}O$, or mixtures thereof at any proportion. As used herein, n(OH) means the total number of OH moieties in a material.

As used herein, the term "deuteroxyl(s)" or OD means a moiety or a group of moieties each consisting of an oxygen atom and a deuterium atom (D). The oxygen atom may be $^{16}O$, $^{17}O$ or $^{18}O$, or mixtures thereof at any proportion. As used herein, n(OD) means the total number of OD moieties in a material.

In the present application, the two terms "hydroxyl-doped" and "OH-doped" are used interchangeably. A hydroxyl-doped or OH-doped material means the material comprises OH moieties and optionally OD moieties, and the ratio of n(OH)/(n(OD)+n(OH)) in the material is equal to or higher than the natural isotopic abundance of H. To that extent, a material in which all the OH moieties originate from normal water comprising $H_2O$ and $D_2O$ at essentially the natural isotopic abundances of H and D is regarded as OH-doped.

In the present application, the two terms "deuteroxyl-doped" or "OD-doped" are used interchangeably. A deuteroxyl-doped or OD-doped material means the material comprises OD moieties and optionally OH moieties, and the ratio of n(OD)/(n(OD)+n(OH)) in the material is higher than the natural isotopic abundance of D. OD-doped silica glass and method of making such glass was disclosed in, e.g., co-pending, co-assigned U.S. patent application Ser. No. 11/348,956, filed on Feb. 6, 2006 and now published as US2007/0105703A1, and U.S. patent application Ser. No. 11/583,619, filed on Oct. 19, 2006 and now published as US2007/0105704A1, the contents of the relevant parts of which are relied upon and incorporated herein by reference in their entirety.

In the present application, OY means OH or OD or if not specified, both. Y-Y' means $D_2$ or $H_2$ or HD, if not specified, any mixture or combination of two or three of them at any proportion.

By "F-doped" in the present application is meant that the glass comprises at least 0.1 ppm by weight of fluorine. As used herein, n(F) means the total number of F moieties in a material.

By "xEy" is meant $x \cdot 10^y$. Thus, e.g., $5E19 = 5 \cdot 10^{19}$; and $5E-4 = 5 \cdot 10^{-4}$.

By "capable of being used in the light path of the lithographic irradiation of a lithographic device operating at a wavelength below about 300 nm" is meant that:

(i) The material can be used in the light path of the lithographic irradiation while the lithographic device is being operated during the normal use for the intended function, i.e., performing lithography function in, e.g., the process of making semiconductor devices; and (ii) The material can be used in the light path for the purpose of re-directing or manipulating the lithographic irradiation.

One of ordinary skill in the art of lithography understands that for a material to be capable of being used in the light path of the lithographic irradiation of a lithographic device operating at a certain wavelength, the material should have the required composition and properties, such as internal transmission, laser induced wavefront distortion, induced absorption, and the like. One of ordinary skill in the art of lithography also understands that it is generally desired that the materials can be made at a reasonably low cost to the manufacturer and to the society at large (thus lower negative environmental impact if possible).

Typically, to be capable of being used in the light path of the lithographic irradiation of a lithographic device operating at a wavelength of below about 300 nm, the silica glass is desired to have an internal transmission at 248 nm of at least 99.00%/cm. It is highly desired, in certain applications, especially lithographic applications for making semiconductor chips operating at 193 nm, the silica glass has an internal transmission of at least 99.00%/cm at 193 nm.

Typically, to be capable of being used in the light path of the lithographic irradiation of a lithographic device operating at a wavelength of below about 300 nm, the silica glass is desired to have a sodium concentration of lower than 100 ppm by weight, in certain embodiments lower than 50 ppm, in certain other embodiments lower than 10 ppm. To be capable of being used in the light path of the lithographic irradiation of a lithographic device operating at a wavelength of below 250 nm, such as at 248 nm or 193 nm, it is desired that the silica glass has a sodium concentration of lower than 500 ppb by weight, in certain embodiments lower than 100 ppb, in certain embodiments lower than 50 ppb, in certain other embodiments lower than 10 ppb.

Fictive temperature is a temperature at which a frozen-in glass structure would be at equilibrium. The Si—O—Si bond angle is a function of fictive temperature. The infrared absorption wavelength, or frequency, of Si—O—Si species varies with bond angle. Thus infrared absorption can be used to determine an approximate fictive temperature. An empirical relation between fictive temperature and absorption frequency is given in the prior art such as Agarwal et al., *A simple IR spectroscopic method for determining fictive temperature of silica glasses*, Journal of Non-crystalline Solids 185 (1995) 191. Raman scattering can also be used to determine fictive temperature using the scattering frequency of silica defects related to strained ring structure.

As used herein, the term "polarization-induced birefringence" means the peak measured birefringence level in the center portion of the uniformly exposed area of the glass after a certain time interval or laser pulses, if a pulsed laser beam is used, less the initial birefringence of the glass before the exposure. The polarization-induced birefringence levels as claimed in the present application are magnitude (absolute value) thereof. In the present application, when exposing the glass to quantify the polarization-induced birefringence level of the silica glass, a linearly polarized pulsed laser beam at the interested wavelength (such as approximately 193 nm or 157 nm, e.g.) with a given area, fluence and pulse length is directed to a fixed area of the glass sample. The birefringence at the center portion of the exposed area is measured after a certain number of pulses. The polarization-induced birefringence value is calculated by subtracting the initial birefringence of the glass from the measured center birefringence.

As used herein, the term "induced edge birefringence" means the measured peak birefringence level in the peripheral portion outside of but abutting the exposed area (i.e., the area right at the aperture where the light intensity changes from nominal value to zero) of the glass after a certain time interval or laser pulses, if a pulsed laser beam is used, less the initial birefringence of the glass before the exposure. In the present application, the induced edge birefringence of the silica glass is measured after a pulsed laser beam at the interested wavelength (such as approximately 193 nm or 157 nm) with a given area, fluence and pulse length has been directed to a fixed area of the glass sample for a certain period of time or a given number of pulses. The induced edge birefringence value is calculated by subtracting the initial birefringence of the glass from the peak measured birefringence at the peripheral portion.

As used herein, "low polarization-induced birefringence at 193 nm" means a polarization-induced birefringence of less than or equal to 0.25 nm/cm measured at 633 nm after being subjected to 5E9 pulses of linearly polarized pulsed laser beam at 193 nm having a fluence of 600 $\mu J \cdot cm^{-2} \cdot pulse^{-1}$ and a pulse length of 25 ns.

As used herein, "low polarization-induced birefringence at 157 nm" means a polarization-induced birefringence of less than or equal to 7 nm/mm measured at 633 nm after being subjected to 1E7 pulses of linearly polarized pulsed laser beam at 157 nm having a fluence of 250 $\mu J \cdot cm^{-2} \cdot pulse^{-1}$ and a pulse length of 25 ns, in certain embodiments less than or equal to 5 nm/mm, in certain embodiments less than or equal to 3 nm/mm, in certain embodiments less than or equal to 1 nm/mm.

Light-induced wavefront distortion of the bulk glass after exposure to ArF laser ("bulk LIWFD") is measured at 633 nm or 193 nm using method and apparatus available in the prior art. LB633 is the bulk LIWFD measured at 633 nm in nm/cm (which could bear a "+" or "−" sign, depending on whether the glass compacts or expands), LB193 is bulk LIWFD measured at 193 nm in nm/cm (which could bear a + or − sign, depending on whether the glass compacts or expands).

Induced absorption of the glass upon exposure to an excimer laser at approximately 193 nm (IA193) is reported in the present application. $IA193=\log(T_1/T_2)$, where $T_1$ is the internal transmission of the glass in terms of %/cm prior to laser exposure, and $T_2$ is the internal transmission of the glass in terms of %/cm after laser exposure. Induced absorption upon exposure at an interesting wavelength, such as at 193 nm or 157 nm, may be measured at 215 nm. Without intending to be bound by any particular theory, this is because it is believed that induced absorption at 215 nm may be a good indicator of the amount of certain defects in the glass produced as a result of such exposure.

As used herein, the term "variation of refractive index," or "refractive index variation," or "$\Delta n$," means the maximal variation of refractive indices measured in a plane perpendicular to the optical axis of the glass material or glass optical member along a predetermined direction by using interferometry at 633 nm (He—Ne laser) (with tilt and piston taken out, as indicated infra). As is typically done by one skilled in the art, when discussing refractive index variation along a certain direction, tilt and piston are subtracted. Therefore, the refractive index variation along a certain direction (such as the radial direction in a sample prepared by using the OVD process) in the meaning of the present application does not include tilt or piston. Typically, the optical axis of a glass optical member, a glass blank, or a piece of glass material, is selected to be perpendicular to a plane (a cross-section) in which the measured refractive index inhomogeneity is the smallest, in order to obtain a glass member having large clear aperture area.

The preferred method, also the method used herein, for determination of interstitial molecular $H_2$ in fused silica is Raman scattering. Raman spectrometry is obtained using a T64000 spectrometer from HORIBA JobinYvon Inc. with an EEV charge-coupled device (CCD) detector. The hydrogen molecule concentration in molecules/$cm^3$ was obtained from the ratio of the intensity detected from the hydrogen molecule scattering peak at 4135 $cm^{-1}$ ($I_{4135}$) to the intensity of the silica scattering peak at 800 $cm^{-1}$ ($I_{800}$), i.e., $I_{4135}/I_{800}$, in the laser Raman spectrum (See, V. S. Khotimchenkô et al., Prikladnoi Spektroskopii, 46 (6), 987-997 (1986)). More specifically, the intensities of the peaks were determined by integrating the areas under the peaks using a linear or quadratic fit to the background. $D_2$ and HD concentrations in the glass in the present application were measured using Raman spectroscopy as well (see, e.g., B. Schrader, Infrared and Raman Spectroscopy, Methods and Applications, VCH, Weinheim (1995), ISBN 3-527-26446-9; H. Komine, *IEEE Journal of Quantum Electronics*, vol. QE-22, No. 4 (April 1986)). $D_2$ concentration was measured at 2973 $cm^{-1}$ and HD concentration was measured at 3606 $cm^{-1}$.

The OH group has characteristic absorption bands near 2.72 $\mu m$ (3676 $cm^{-1}$), 2.21 $\mu m$ (4525 $cm^{-1}$) and 1.38 $\mu m$ (7246 $cm^{-1}$) in fused silica. Concentration of OH was measured by FTIR using the peak height of either the 3676 $cm^{-1}$ or the 4525 $cm^{-1}$ absorption band.

The OH concentration, c, in mol·$liter^{-1}$, is derived from the Beers-Lambert Law $$A = \epsilon \cdot c \cdot b,$$

where the absorbance $A = \log(T_{ref}/T_{OH})$; $T_{ref}$=Transmittance of sample at reference position, a non-absorbing wavelength such as 4000 $cm^{-1}$; $T_{OH}$=Transmittance of sample at OH absorption peak (~3676 $cm^{-1}$ for silica); $\epsilon$ is the molar absorptivity in liter·$mol^{-1} \cdot cm^{-1}$; c is concentration in mol·$liter^{-1}$; and b is the pathlength (sample thickness) in cm:

$$c(\text{mol·liter}^{-1}) = A/(\epsilon \cdot b).$$

Concentration of OH in ppm by weight was calculated from c in mol·$liter^{-1}$ using the density of the silica glass (approximately 2.2 g/$cm^3$) and molecular weight of OH (approximately 17 g/mol). The constant $\epsilon$ for high purity silica glass at a particular wavelength is available in the prior art.

Concentration of OD in silica glass was obtained in a similar manner, namely, starting from FTIR measurement and calculated by using the Beers-Lambert Law:

$$A = \epsilon \cdot c \cdot b,$$

where the absorbance $A' = \log(T'_{ref}/T_{OD})$; $T'_{ref}$=Transmittance of sample at reference position, a non-absorbing wavelength such as 2780 $cm^{-1}$; $T_{OD}$=Transmittance of sample at OD absorption peak (~2705 $cm^{-1}$ for silica); $\epsilon'$ is the molar absorptivity in liter·$mol^{-1} \cdot cm^{-1}$ (57.4 liter·$mol^{-1} \cdot cm^{-1}$ at 2705 $cm^{-1}$); c' is concentration of OD in mol·$liter^{-1}$; and b' is the path length (sample thickness) in cm:

$$c'(\text{mol·liter}^{-1}) = A'/(\epsilon' \cdot b').$$

Concentration of OD in ppm by weight was calculated from c' in mol·$liter^{-1}$ using the density of the silica glass (approximately 2.2 g/$cm^3$) and molecular weight of OD (approximately 18 g/mol). The constant $\epsilon'$ for high purity silica glass at a particular wavelength is available in the prior art.

As used herein, a "particle preform" means an object having a shape and comprising a plurality of solid particles. Thus a particle preform in the present application may be, for example, a soot preform consisting essentially of silica soot particles obtained from flame hydrolysis processes, a green body comprising a number of silica particles obtained from the sol-gel process, and the like.

As used herein, the term "soot dispenser" means a device which dispenses pre-formed soot particles by, e.g., spraying.

In search of silica glass materials with desired optical properties, especially in terms of initial internal transmission, LIWFD, light-induced absorption, polarization-induced birefringence, and the like, the present inventors have unexpectedly found that F-doped high purity fused silica glass exhibits comparable, and in certain important respects, superior, performance than non-F-doped glass with comparable OH concentration. The present invention is based on this discovery.

The present invention is described mostly in the context of microlithography at 193 and 157 nm. However, it should be understood that the material of the present invention may be used in and for other applications, including but not limited to: lithography at 248 nm, i-line and g-line lithography, laser generators, lithographic inspection devices, and the like.

The present inventors have prepared synthetic silica glass materials doped with F capable of being used in below 300 nm UV lithographic applications. As mentioned above, the present inventors have found that, unexpectedly, F-doped lithographic synthetic silica glass materials, especially those with a high n(F)/(n(F)+n(OD)+n(OH)) ratio, tend to have better optical properties than non-F-doped silica glass with essentially the same level of total concentration of F, OH and OD ([F]+[OH]+[OD]).

Moreover, the present inventors have discovered, unexpectedly, that F-doped high purity fused silica glass exhibits improved light induced absorption (IA) over the corresponding OH-doped high purity fused silica glass.

Co-pending, co-assigned U.S. patent application Ser. No. 11/241,075, entitled "SYNTHETIC SILICA HAVING LOW POLARIZATION-INDUCED BIREFRINGENCE, METHOD OF MAKING SAME AND LITHOGRAPHIC DEVICE COMPRISING SAME" and filed on Sep. 30, 2005, now published as United States Patent Application Publication No. 2006-0137399 A1) discloses and studies the polarization-induced birefringence phenomenon in synthetic silica glass material, the content of which is incorporated herein by reference in its entirety. The silica glass materials studied in the examples of this patent application were essentially OH-doped. It states that "among others, OH concentration in the glass is a major factor affecting the polarization-induced birefringence of the glass. Generally, all other conditions remaining equal, the higher the OH level, the higher the polarization-induced birefringence of the glass. Thus, the present inventors have found that, to achieve a low level of polarization-induced birefringence in the silica glass, it is desired that the OH concentration in the glass is less than 500 ppm by weight, preferably less than 300 ppm, more preferably less than 100 ppm, still more preferably less than 50 ppm, most preferably less than 20 ppm."

The F-doped silica glass of the present invention is capable of being used in lithography below 300 nm. It can be used in lithographic devices operating at longer wavelength, such as in the I-line lithography at 365 nm. In certain preferred embodiments, the F-doped silica glass of the present invention is capable of being used as refractive lens elements in the light path of the UV irradiation utilized in the dry lithographic devices operating at 248 nm. In certain preferred embodiments, the F-doped silica glass of the present invention has the composition and property requirements for use as refractive lens elements in the light path of the UV irradiation utilized in the immersion lithographic devices operating at 248 nm. In certain other preferred embodiments, the F-doped silica glass of the present invention is capable of being used as refractive lens elements in the light path of the UV irradiation utilized in the dry lithographic devices operating at 193 nm. In certain preferred embodiments, the F-doped silica glass of the present invention has the composition and property requirements for use as refractive lens elements in the light path of the UV irradiation utilized in the immersion lithographic devices operating at 193 nm. In certain preferred embodiments, the F-doped silica glass of the present invention has the composition and property requirements for use as refractive lens elements in the light path of the UV irradiation utilized in the immersion lithographic devices operating at 157 nm. In certain preferred embodiments, the F-doped silica glass of the present invention has the composition and property requirements for use as photomask substrates in the light path of the UV irradiation utilized in the immersion lithographic devices operating at 248 nm, 193 nm, and/or 157 nm. One of ordinary skill in the art of lithography knows that for silica glasses to be used as lens elements in these applications, stringent requirements regarding optical performance such UV transmission, UV degradation in terms of induced absorption, light induced wavefront distortion (LIWFD), refractive index homogeneity, fictive temperature, birefringence, light induced birefringence, be must satisfied. Ample literature has discussed the relationship between these required optical performance and the composition of the glass in terms of OH concentration and distribution, halogen concentration and distribution, alkali metal concentration and distribution, transition metal concentration and distribution, and the like. High purity fused silica glass doped with F has, inter alia superior performance in polarization-induced birefringence when subjected to linear polarized irradiation. Therefore, the glass of the present invention, especially those doped with high ratio of [F]/([F]+[OH]+[OD]) (where [F], [OD] and [OH] are all in mole·cm$^{-3}$), can be advantageously used in immersion lithographic technology. Of course, the F-doped silica glass may be used as the material for lens elements in reflective lithography operating in the vacuum UV and X-ray spectrum. These applications have special requirements on the other physical properties of the glass.

The synthetic silica glass material of the present invention may be essentially devoid of OH and OD. However, it is not ruled out that it may contain a certain level of OH or OD in the glass. Nonetheless, in certain preferred embodiments of the F-doped synthetic silica glass of the present invention, it has an n(F)/(n(F)+n(OD)+n(OH)) ratio and/or [F]/([F]+[OH]+[OD]) of higher than 0.05, in certain embodiments preferably higher than 0.1, in certain embodiments preferably higher than 0.2, in certain embodiments preferably higher than 0.3, in certain embodiments preferably higher than 0.4, in certain embodiments preferably higher than 0.5, in certain other embodiments preferably higher than 0.8, in certain other embodiments preferably higher than 0.90, in certain other preferred embodiments higher than 0.95, in certain other embodiments preferably higher than 0.99. It has been demonstrated by the present inventors that high purity synthetic silica glass with various levels of [F] can be obtained by using the soot-to-glass method.

In certain embodiments of the F-doped silica glass of the present invention, the glass has a combined OH and OD concentrations of lower than 600 ppm by weight, in certain embodiments preferably lower than 160 ppm, in certain other preferred embodiments lower than 50 ppm, in certain other embodiments preferably lower than 20 ppm, in certain other embodiments preferably lower than 1 ppm, in certain other embodiments still preferably lower than 0.1 ppm.

In certain embodiments of the F-doped synthetic silica glass of the present invention, the glass has an OD concentration of lower than 1400 ppm by weight, in certain preferred embodiments lower than 1000 ppm, in certain preferred embodiments lower than 800 ppm, in certain other preferred embodiments lower than 500 ppm, in certain other preferred embodiments lower than 300 ppm, in certain other preferred embodiments lower than 150 ppm, in certain other preferred embodiments lower than 50 ppm, in certain other preferred embodiments lower than 20 ppm, in certain other embodiments lower than 1 ppm, in certain embodiments from 0.1 to 1400 ppm, in certain other embodiments from 0.1 to 1000 ppm, in certain embodiments from 0.1 to 800 ppm, in certain other embodiments from 0.1 to 500 ppm, in certain other embodiments from 0.01 to 150 ppm, in certain other embodiments from 0.01 to 50 ppm, in certain other embodiments from 0.01 to 20 ppm.

In certain embodiments of the F-doped synthetic silica glass of the present invention, the glass has less than 500 ppm by weight of OH and 0.15-1400 ppm OD. In certain embodiments of the F-doped synthetic silica glass of the present invention, the glass comprises less than 150 ppm by weight of OH and 0.1-1400 ppm OD. In certain other embodiments of the F-doped synthetic silica glass of the present invention, the glass comprises less than 20 ppm by weight of OH and 0.01-1400 ppm OD. In certain other embodiments of the F-doped synthetic silica glass of the present invention, the glass comprises less than 20 ppm by weight of OH and 0.01-300 ppm OD.

In certain embodiments of the F-doped synthetic silica glass of the present invention, the glass has a [F] variation, measured in a plane essentially perpendicular to the optical axis of the glass, of less than 100 ppm by weight, in certain embodiments less than 80 ppm, in certain embodiments less than 50 ppm, in certain embodiments less than 30 ppm, in certain embodiments less than 20 ppm, in certain embodiments less than 10 ppm, in certain embodiments less than 5 ppm, in certain other embodiments less than 2 ppm, in certain other embodiments less than 1 ppm, in certain other embodiments less than 0.1 ppm. In certain embodiments of the F-doped synthetic silica glass of the present invention, the glass has, in addition to or in absence of the [F] variation described in this paragraph, an [OH]+[OD] variation, measured in a plane essentially perpendicular to the optical axis of the glass, of less than 100 ppm by weight, in certain embodiments less than 80 ppm, in certain embodiments less than 50 ppm, in certain embodiments less than 30 ppm, in certain embodiments less than 20 ppm, in certain embodiments less than 10 ppm, in certain embodiments less than 5 ppm, in certain other embodiments less than 2 ppm, in certain other embodiments less than 1 ppm.

The F-doped synthetic silica glass of the present invention may be essentially free of dopants other than F. However, it is not ruled that the F-doped synthetic silica glass of the present invention comprises dopants such as OH, OD (as indicated supra), Al, Cl and Ti. The Ti-containing F-doped silica glass of the present invention may be advantageously used in the substrates for reflective optical elements, especially those requiring high thermal dimensional stability, such as those used in reflective lithography technology operating in vacuum UV and X-ray spectra.

The F-doped synthetic silica glass may be doped with molecular $H_2$, HD and/or $D_2$. In certain preferred embodiments, the F-doped synthetic silica glass of the present invention has a concentration of $[H_2]$, [HD] and $[D_2]$, in total, of from 1E15 to 1E19 molecules/$cm^3$, in certain embodiments higher than 5E15 molecules/$cm^3$, in certain embodiments higher than 1E16 molecules/$cm^3$, in certain preferred embodiments below 5E18 molecules/$cm^3$, in certain other preferred embodiments below 5E17 molecules/$cm^3$, in certain other preferred embodiments below 2E17 molecules/$cm^3$, in certain other preferred embodiments from 1E16 to 2E17 molecules/$cm^3$. In certain preferred embodiments of the F-doped synthetic silica glass of the present invention, the ratio of $(2n(H_2)+n(HD))/2(n(H_2)+n(HD)+n(D_2))$ is higher than 0.1, in certain preferred embodiments higher than 0.3, in certain other preferred embodiments higher than 0.5, in certain other embodiment higher than 0.7, in certain other preferred embodiments higher than 0.9. In certain preferred embodiment, the ratio of $(2n(H_2)+n(HD))/2(n(H_2)+n(HD)+n(D_2))$ in the glass is essentially the natural isotopic abundance of H by mole. In certain other embodiments, the ratio of $(2n(D_2)+n(HD))/2(n(H_2)+n(HD)+n(D_2))$ is higher than 0.1, in certain preferred embodiments higher than 0.3, in certain other preferred embodiments higher than 0.5, in certain other embodiment higher than 0.7, in certain other preferred embodiments higher than 0.9. In certain preferred embodiment, the ratio of $(2n(D_2)+n(HD))/2(n(H_2)+n(HD)+n(D_2))$ in the glass is essentially the natural isotopic abundance of D by mole.

It is known that alkali, alkaline earth and transition metals can be detrimental to the transmission characteristics of silica glasses. See, for example, Schultz, P. C., Optical Absorption of the Transition Elements in Vitreous Silica, Journal of The American Ceramic Society, 57 (7), pp 309-313, (July 1974); U.S. Pat. No. 6,174,509 B1 to Corning Incorporated, entitled "Pure Fused Silica, Furnace and Method;" and U.S. Pat. No. 6,698,248 B2 to Corning Incorporated, entitled "Methods and Furnaces for Fused Silica Production." U.S. Pat. No. 6,174,509 B1 discloses an article produced by collecting molten silica particles in a refractory furnace in which at least a portion of the refractory has been exposed to a halogen-containing gas to react with contaminating metal ions in the refractory. Improvement in the zircon refractory, as disclosed in U.S. Pat. No. 6,174,609, alleviated the effect of sodium ion contamination in a fused silica article. However, it was then found that other contaminants also exist in the furnace refractory in addition to sodium. These include the alkaline earth metals, and transition metals, such as iron, titanium and lead, aluminum, phosphorous and sulfur. U.S. Pat. No. 6,698,248 B2 discloses methods and apparatus for producing fused silica members having high internal transmission. The apparatus and methods as disclosed was capable of producing fused silica having internal transmission of at least 99.65%/cm at 193 nm. In this reference, it was stated that: "The next generation of fused silica glass used in the microlithography market will require ArF (193 nm) internal transmission exceeding 99.65%/cm, and preferably exceeding 99.75%/cm. The standard manufacturing processes described above is capable of consistently producing fused silica lens blanks with 99.5%/cm. Reduction of metal contaminants, which have a major impact on UV transmission, has played a major role in the production of higher transmission fused silica. The effects of metals, such as sodium, potassium and iron, are evident at the 10's of parts per billion level. The standard process has demonstrated the ability to produce fused silica having transmission of 99.65%/cm, without sacrificing glass homogeneity, but not in the quantity needed to make large production quantities of lens blanks and not with the consistency to serve as a basis for a production process. Accordingly, it would be desirable to provide methods and apparatus capable of consistently manufacturing large production quantities of fused silica having internal transmission equal to or greater than 99.65%/cm at 193 nm, and preferably greater than 99.75%/cm." It should be noted, however, that the silica glasses discussed in these references were all OH-containing, non-OD-doped.

It is also known that high purity synthetic silica glass material are required to have a very low level of alkali metals, alkaline earth and transition metals in order to have a sufficient transmission properties (e.g., absorption, induced absorption, fluence-dependent-transmission, birefringence, light-induced birefringence, LIWFD, and the like) in the wavelength of interest in the UV, such as for use as refractive members in KrF and ArF lithography devices. Certain metals having multiple oxidation states can cause more absorption at one oxidation state than at others. Thus, in certain embodiments of the F-doped silica glass of the present invention, the glass comprises less than 100 ppm by weight, in certain embodiments less than 50 ppm, in certain embodiments less than 10 ppm, in certain embodiments preferably less than 1 ppm, in certain embodiments preferably less than 500 ppb, in certain embodiments less than 300 ppb, in certain embodiments less than 100 ppb, in certain embodiments less than 50 ppb, in certain embodiments preferably less than 20 ppb, in certain other embodiments preferably less than 10 ppb, of any alkali metal, any alkali earth metal, and any transition metal. Among all metals, sodium is one of the most difficult to reduce from the glass composition because it is virtually ubiquitous and can be introduced into the glass in the handling process. Sodium also diffuses into consolidated glass and soot preforms extraordinarily fast at elevated temperatures, especially at above 800° C. Nonetheless, in order for the glass to have the capability to be used as refractive optical element in a lithographic device operating at a wavelength below 300 nm, such as at 248 nm or 193 nm, it is typically desired that the glass comprises sodium lower than 100 ppb by weight, in certain embodiments lower than 50 ppb, in certain embodiments lower than 30 ppb, in certain embodiments lower than 10 ppb (such as for use in lithography devices operating at 193 nm), and in certain embodiments lower than 5 ppb. The present inventors have made F-doped high purity silica glass with such low level of sodium. In certain embodiments, the glass comprises any transition metal at less than 2 ppb. In certain other embodiments, the glass comprises any transition metal at less than 1 ppb. In certain other embodiments, the glass comprises any transition metal at less than 0.5 ppb. In certain embodiments, especially for glasses to be used as refractive optical member in ArF laser lithography devices, it is preferred that the glass comprises any individual element in all oxidation states of the following in concentrations less than 2 ppb by weight, in certain embodiments preferably less than 1 ppb, in certain other embodiments less than 0.5 ppb, in certain other embodiments less than 0.1 ppb: Ti (+2, +4, for example), V (+5, +4, for example), Cr (+6, +3, for example), Mn (+6, +4, +2, for example), Fe (+3, +2, for example), Co (+3, +2, for example), Ni (+2, for example), Cu (+2, +1, for example), Zn (+2, for example), Ge (+4, +2, for example), Zr (+4, for example), Ag (+1, for example), Cd (+2, for example), Sn (+4, +2, for example), Pb (+4, +2, for example), Bi (+5, +3, for example) and U (+6, +3, for example). Of course, elemental metals (in 0 state) are generally detrimental to the transmission properties of the glass. In certain embodiments of the F-doped synthetic silica glass of the present invention, it comprises less than 100 ppm by weight, in certain embodiments less than 50 ppm, in certain embodiments less than 10 ppm, in certain embodiments preferably less than 1 ppm, in certain embodiments preferably less than 500 ppb, in certain embodiments less than 300 ppb, in certain embodiments less than 100 ppb, in certain embodiments less than 50 ppb, in certain embodiments preferably less than 30 ppb, in certain other embodiments preferably less than 10 ppb, of any and all metals in all oxidation states in total.

In certain preferred embodiments of the F-doped synthetic silica glass of the present invention, the glass exhibits a light-induced wavefront distortion (LIWFD), measured at 633 nm (LB633), from 0 to 1.5 nm/cm (in certain embodiments from 0 to 1.25 nm/cm, in certain embodiments from 0 to 1.0 nm/cm, in certain other embodiments from 0 to 0.5 nm/cm) at a dose $$\left(N' \cdot \frac{F^2}{\tau}\right)^{0.6}$$

of 6, where N'=1375 is number of pulses in millions of the linearly polarized ArF excimer laser to which the sample was exposed to when the LB633 is measured, F=0.6 is the fluence of the ArF excimer laser in mJ·cm$^{-2}$·pulse$^{-1}$, and $\tau$=25 is pulse length of the ArF excimer laser in ns.

In certain preferred embodiments of the F-doped synthetic silica glass of the present invention, the glass exhibits a light-induced wavefront distortion (LIWFD), measured at 193 nm (LB193), from 0 to 2.5 nm/cm (in certain embodiments from 0 to 2.2 nm/cm, in certain embodiments from 0 to 1.5 nm/cm, in certain embodiments from 0 to 1.0 nm/cm, in certain other embodiments from 0 to 0.5 nm/cm) at a dose $$\left(N' \cdot \frac{F^2}{\tau}\right)^{0.6}$$

of 6, where N'=1375 is number of pulses in millions of the linearly polarized ArF excimer laser to which the sample was exposed to when the LB193 is measured, F=0.6 is the fluence of the ArF excimer laser in mJ·cm$^{-2}$·pulse$^{-1}$, and $\tau$=25 is pulse length of the ArF excimer laser in ns.

In certain embodiments of the F-doped synthetic silica glass of the present invention, the glass exhibits less than 0.25 nm/cm, in certain embodiments preferably less than 0.1 nm/cm, in certain embodiments preferably less than 0.05 nm/cm, of polarization-induced birefringence (magnitude) measured at 633 nm after being subjected to 5E9 pulses of linearly polarized pulsed laser beam at 193 nm having a fluence of 600 μJ·cm$^{-2}$·pulse$^{-1}$ and a pulse length of 25 ns.

In certain embodiments of the F-doped synthetic silica glass of the present invention, the glass exhibits less than 7 nm/mm, in certain embodiments preferably less than 5 nm/mm, in certain embodiments preferably less than 3 nm/mm, in certain embodiments preferably less than 1 nm/mm, of polarization-induced birefringence (magnitude) measured at 633 nm after being subjected to 10 million pulses of linearly polarized pulsed laser beam at 157 nm having a fluence of 250 μJ·cm$^{-2}$·pulse$^{-1}$ and a pulse length of 25 ns.

In certain embodiments of the F-doped synthetic silica glass of the present invention, the glass exhibits an initial internal transmission at 193 nm of at least 99.00%/cm, in certain embodiments desirably at least 99.50%/cm, in certain embodiments desirably at least 99.65%/cm, in certain embodiments preferably at least 99.75%/cm, in certain other embodiments preferably at least 99.80%/cm.

In certain embodiments of the F-doped synthetic silica glass of the present invention, the glass exhibits a fictive temperature of lower than 1150° C. In certain other embodiments of the F-doped synthetic silica glass of the present invention, the glass exhibits a fictive temperature of lower than 1000° C. In certain embodiments of the glass of the present invention, it exhibits a fictive temperature of higher than 800° C.

In certain embodiments of the F-doped synthetic silica glass of the present invention, the glass exhibits a refractive index variation measured in a plane perpendicular to at least one direction of less than 10 ppm, in certain embodiments preferably less than 5 ppm, in certain other embodiments preferably less than 2 ppm, in certain other embodiments preferably less than 1 ppm, in certain other embodiments preferably less than 0.5 ppm.

Another aspect of the present invention is an optical glass member comprising the F-doped synthetic silica glass material of the present invention described in general and in detail above and illustrated below. The optical glass member advantageously is used in the light path of an irradiation having a wavelength of shorter than 300 nm, though the glass member of the present invention may be used in the light path of irradiation having a longer wavelength, such as in the visible spectrum, or in the infrared spectrum. The F-doped glass of the present invention is particularly advantageous for use in certain infrared applications where OH and/or OD are undesirable. Non-limiting examples of such glass member of the present invention may include, but are not limited to, optical members for use as refractive lens elements, sputter targets, and the like. The refractive lens elements may be used in, e.g., lithographic scanners and steppers machines, laser generators, laser etalons, lithographic inspection devices, and the like. The F-doped glass optical member of the present invention is particularly suited for devices involving high-fluence irradiations due to its improved laser damage resistance.

Still another aspect of the present invention is a lithographic system comprising at least one optical member of the present invention. The lithographic system is advantageously an immersion system in which at least one lens element is allowed to contact a liquid. Immersion lithographic systems usually utilize linearly polarized irradiation. Due to the high resistance to polarization-induced birefringence damage, the F-doped synthetic silica glass member of the present invention is particularly suitable for such lithographic systems. Due to the excellent performance of the F-doped glass material of the present invention, as mentioned supra, it may be used in traditional dry lithographic tools operating below 300 nm, such as at 248 nm, 193 nm and 157 nm.

The F-doped synthetic silica glass material of the present invention may be produced by using various methods, such as the direct-to-glass method, the soot-to-glass methods and the sol-gel processes, to name a few. Generally, the F-doped silica glass of the present invention may be produced by: (i) utilizing F-containing starting materials to produce silica; (ii) making silica glass in an F-containing environment; or (iii) doping silica glass with F.

The first method is a direct-to-glass method. Broadly speaking, this process includes the following steps:

(I) providing a plurality of particles comprising silica;

(II) depositing the a plurality of particles on a supportive deposition surface at an elevated temperature such that the particles are consolidated into transparent glass material in situ, wherein:

in step (II), the deposition and consolidation are carried out in an F-containing atmosphere, such that the obtained silica glass comprises F.

In step (I), the plurality of particles comprising silica may be provided by flame hydrolysis of at least one precursor compound comprising silicon, such as silicon halides (such as $SiCl_4$) or organosilicon compounds. As non-limiting example of organosilicon compound, mention may be made of octamethylcyclotetrasiloxane (OMCTS).

There is abundant literature on equipment and processes for making high-purity fused silica material by using the direct-to-glass method, which can be adapted for making high-purity F-doped fused silica glass of the present invention. For example, it is highly desired that the supportive deposition surface in step (II) is an essentially planar deposition surface of a horizontal rotating table. Generally, in order to obtain F-doped fused silica glass for use in deep UV and vacuum UV lithographic devices, the glass should be produced by using high purity raw materials and processing agents in a very clean environment, and care should be taken to avoid contamination by metals detrimental to the desired properties. Low metal impurities are obtained via high purity starting materials and apparatus for making the soot (and corresponding consolidated glass) and/or purifying the soot (and apparatus used to consolidate the soot) with, e.g., $Cl_2$ or $Cl_2+CO$, $CF_4$, to remove trace metals. Where the particles in step (I) are pre-fabricated, they may have essentially the same composition or differing compositions (e.g., certain particles comprising dopants and particles essentially free of dopants can be mixed and provided in step (I)).

The consolidated glass produced in step (II) may be further subjected to the following step:

(III) treating the consolidated glass obtained in step (II) in an atmosphere comprising $H_2$ and/or HD and/or $D_2$.

The purpose of step (III) is to adjust the level of molecular hydrogen ($H_2$, HD and/or $D_2$) in the consolidated glass to a desired level. In certain embodiments, hydrogen molecules doped at desired level in the glass can improve the optical performance of the material. Such hydrogen-treatment is desired to be conducted below 600° C. In certain cases it may be desired to be conducted at above 600° C. Generally, it is desired that it is carried out at below 1000° C. Generally, it is desired that the treatment time and temperature of step (III) is chosen such that the sum total of the concentration of $H_2$, HD and $D_2$ in the treated glass is from 0.5E15 to 5E19 molecules/$cm^3$, in certain embodiments preferably from 0.5E15 to 5E18 molecules/$cm^3$, in certain other embodiments preferably from 1E15 to 1E18 molecules/$cm^3$ in certain embodiments preferably from 0.5E16 to 5E18 molecules/$cm^3$, in certain other embodiments preferably from 1E16 to 1E18 molecules/$cm^3$, in certain other embodiments preferably from 1E16 to 2E17 molecules/$cm^3$.

As mentioned above, in certain embodiments, after step (II), before or after step (III), the glass may be subjected to a heat treatment (such as annealing).

Another method of the present invention for making F-doped synthetic silica glass of the present invention, termed "particle-to-glass" herein, involves the formation of a porous particle preform. This method comprises the following steps:

(A) providing a particle preform comprising a plurality of particles comprising silica;

(B) optionally purifying and/or drying the particle preform;

(C) optionally further doping the particle preform with dopants;

(D) consolidating the particle preform at an elevated temperature to densified glass; and (E) optionally treating the consolidated glass obtained in step (D) in the presence of $H_2$, HD and/or $D_2$, wherein in at least one of steps (A), (B), (C), and (D), F is introduced into or formed in the glass.

As mentioned above, in certain embodiments, after step (D), before or after step (E), the glass may be subjected to a heat treatment (such as annealing).

In one embodiment of this process, step (A) comprises the following steps:

(A1) providing a plurality of particles; and (A2) depositing the particles on a supporting surface to form the particle preform. The supporting surface is preferred to be rotating in certain embodiments.

In step (A1), the particles may be provided by (A1.1) flame hydrolysis (which may be plasma-assisted) of at least one silicon-containing precursor compound (such as silicon halides (e.g., $SiCl_4$) or organosilicon compounds. As a non-limiting example of organosilicon compound, mention may be made of octamethylcyclotetrasiloxane (OMCTS)); or (A1.2) a soot dispenser, which may be plasma-assisted; or (A1.3) other plasma-assisted process. In the present application, the particle-to-glass process involving step (A1.1) is termed "soot-to-glass" process. Soot-to-glass process for making regular non-F-doped high-purity fused silica glass is described in, for example, co-pending, co-assigned patent application Ser. No. 11/148,764, entitled "HIGH REFRACTIVE INDEX HOMOGENEITY FUSED SILICA GLASS AND METHOD OF MAKING SAME" and filed on Jun. 8, 2005, now published as United States Patent Application Publication No. 2006-0137398 A1, the relevant part of which is incorporated herein by reference.

Particles provided by step (A1.1) may be F-doped or non-F-doped.

Step (A2) can be carried out by various methods such as (A2.1) outside vapor deposition; (A2.2) inside vapor deposition; (A2.3) vapor axial deposition; (A2.4) planar deposition, and the like. There is abundance literature describing these methods for making regular non-F-doped glass comprising silica, which can be adapted for making the F-doped synthetic silica glass of the present invention.

A sol-gel process may be employed in step (A) to produce the particle preform, which comprises the following steps:
(A(i)) forming a sol-gel comprising silica; and
(A(ii)) forming the particle preform from the sol-gel.

Step (A(i)) may be carried out in the presence of or from at least one D-containing compound.

Particle preforms produced by flame hydrolysis and sol-gel processes may comprise undesirably high amount of OH and OD. Particle preforms produced from sol-gel process may even comprise substantial amounts of $H_2O$ and/or $D_2O$. Particle preforms produced by flame hydrolysis methods mentioned above (IVD, OVD, VAD, PD) (typically called soot preforms) involving the burning of fuels comprising H and/or D ($H_2$, $D_2$, $CH_4$, $CDH_3$, and the like, for example) and/or precursor compounds comprising H and/or D (OMCTS, for example) typically comprise in the soot particles OH and OD groups. For many applications, such amounts of OH and/or OD in the preform would lead to undesirably high level of OH and/or OD in the consolidated glass for the intended purposes. For example, it is understood by the present inventor that low OH/OD glass, such as those comprising a total concentration of OH and OD of less than 500 ppm, in certain embodiments preferably lower than 300 ppm, in certain embodiments preferably lower than 150 ppm, in certain embodiments preferably lower than 50 ppm, may be desired for high purity silica glass for use in optical members used in UV and deep UV lithography devices.

For those particle preforms with undesirably high level of $H_2O$, $D_2O$, OH and/or OD, it is desired that before it is further optionally doped with additional dopants, and before it is consolidated into densified glass, it is at least dried to lower the OD and/or OD concentration to a desirable level. In order to control the final OH and/or OD concentration in the consolidated glass, it is desirable in many cases that the particle preform is dried to have a total concentration of OH and/or OD below 50 ppm by weight, in certain embodiments preferably below 10 ppm, in certain other embodiments preferably below 1 ppm, in certain other embodiments preferably below 0.01 ppm. Where a particle preform comprises below 1 ppm by weight of total OH and/or OD, the particle preform is considered essentially dry for the purpose of the present application.

Drying agents such as dry inert gas, including but not limited to He, Ar, $N_2$, and the like, may be used to reduce the $H_2O$, $D_2O$, OH and/or OD in the particle preform, at an elevated temperature, such as higher than 500° C., in certain embodiments higher than 800° C. CO, $CO_2$, and the like, may be used as drying agent as well. CO may react with silica particles to produce defects in the glass. Such defects may be healed as described infra. Preferred drying agents are $F_2$, $Cl_2$, $Br_2$, halogen compound, CO, $CO_2$, and compatible mixtures thereof. The halogen compound is preferably selected from HX, $COX_2$, $SOX_2$, $CX_4$, $SiX_4$, and $SX_6$, where X is selected from F, Cl, Br and combination thereof. The most preferred drying agent is $Cl_2$ and $Br_2$, without or including CO and mixtures thereof. However, using an F-containing drying agent can also raise [F] in the glass to a desired level.

The particle preform as provided in step (A) may contain contaminants, especially detrimental metal ions, at unacceptably high amounts. This is especially true if sol-gel process is used in producing the particle preforms. Particle preforms produced by sol-gel processes typically contain high levels of Fe, Na, and the like, which are detrimental to the optical performance of the glass in deep UV and vacuum UV spectra. Once the glass is consolidated and the contaminants are incorporated into the consolidated glass, their removal becomes difficult. Therefore, it is highly desirable that prior to consolidation, where necessary, the particle preform is subjected to purification such that contaminant concentrations are reduced to a desired level prior to consolidation of the preform.

Many of the drying agents for removing $H_2O$, $D_2O$, OD and/or OH from the particle preform have contaminant stripping function as well. Those drying agents, when used in the drying process, may function to purify the particle preform simultaneously. Therefore, drying and purifying may advantageously be carried out at the same time, or if desired, different agents may be used to achieve these two different functions. Preferred purifying agents include, but are not limited to, $Cl_2$, $F_2$, Br, a halogen-containing compound, CO, $CO_2$, and the like, and mixtures and combinations thereof. The halogen-containing compound may be HX, $COX_2$, $SOX_2$, $CX_4$ SiX4, and $SX_6$, and the like, where X is selected from F, Cl, Br and combination thereof. The most preferred drying agent are $Cl_2$ and $Br_2$, with or without CO, and compatible mixtures thereof. Again, using an F-containing purifying agent can also raise [F] in the glass to a desired level.

The particle preform may be further doped in step (C) prior to consolidation in step (D). It is also generally understood that doping dopants into consolidated glass is difficult, while doping particle preforms can be carried out in a controlled manner. Thus, the particle preform, with or without the drying/purifying step (B), may be further doped with dopants such as OD, OH, F, Cl, and the like. Doping at elevated temperature such as higher than 500° C., in certain embodiments higher than 800° C., is desirable in order to expedite the doping process. By controlling the doping temperature, the concentration of the dopants in the doping atmosphere, and doping time, one can control the final concentration of the desired dopants in the particle preform, hence the concentration of the desired dopants in the final consolidated glass. To dope the particle preform with F, F-containing compounds such as HF, DF, $COF_2$, $SOF_2$, $SiF_4$, $CF_4$ and $SF_6$ may be used. Therefore, during the drying and/or purifying step (B), the doping of F may be carried out. To dope the particle preform with Cl, $Cl_2$ and Cl-containing compounds such as HCl, $COCl_2$, $SOCl_2$ and $CCl_4$, $SiCl_4$ may be used. Therefore, during the drying and/or purifying step (B), the doping of Cl may be carried out. Thus steps (B) and (C) may be carried out at least partially simultaneously.

For the purpose of the present invention, controlling the concentration of OH and/or OD in the consolidated glass is highly desirable for many applications, as mentioned supra. This can be desirably done in steps (B) and/or (C). For example, in step (B), the particle preform can be dried and purified to a level essentially free of OH and/or OD. Subsequently, in step (C), the dried particle preform is controllably doped with OH and/or OD to a desirable level so that the final consolidated F-doped glass has the desired OD and/or OH concentrations. Doping is desirably effected at an elevated temperature such as higher than 500° C., in certain embodiments higher than 800° C. By choosing the proper doping time, doping temperature, concentration of dopants in the doping atmosphere, one can not only control the final concentrations of OD and/or OH, and other dopants, but also achieve a homogeneous distribution thereof, in the consolidated glass. To dope the particle preform with OD and/or OH, OD-containing and/or OH-containing compounds may be used at various partial pressures in the doping atmosphere. For example, to dope the particle preforms with OD, the doping atmosphere may comprise $D_2$, HD, $D_2O$, $CH_3OD$, $C_2H_5OD$, $CH_3COOD$, and other OD-containing compounds. When $D_2$ and/or HD are present in the doping atmosphere, they may react with the $SiO_2$ glass to produce Si—OD and/or Si—OH in the glass. To dope the particle preforms with OH, the doping atmosphere may comprise $H_2$, HD, $H_2O$, $CH_3OH$, $C_2H_5OH$, $CH_3COOH$, and other OH-containing compounds. Similarly, when $H_2$ and/or HD are present in the doping atmosphere, they may react with the $SiO_2$ glass to produce Si—OH and/or Si—OD in the glass. It is known that reaction between hydrogen gas ($D_2$, DH and/or $H_2$) and $SiO_2$ can lead to the formation of oxygen-deficient sites in the silica glass. Thus, as described infra, it is desired that the particle preform is treated in an oxidizing atmosphere to heal the defects before or during consolidation of the particle preform into densified glass if hydrogen gas is used as a doping agent in the doping atmosphere. If $D_2O$ and/or $H_2O$ are used as the doping agent in the doping atmosphere, they may be fed as they are into the doping environment, or formed in situ by, e.g., reactions between $D_2/H_2$ and $O_2$ fed into the environment separately. To achieve the desired [OD]/[OH] ratio in the final consolidated glass, in the doping step (C), the doping atmosphere may be adjusted to contain the OD-containing and OH-containing compounds having the desired partial pressures thereof. The most preferred OD-doping agent for the particle preform is $D_2O$. $D_2O$ at higher than 99.9% by mole of isotopic purity is commercially available. The most preferred OH-doping agent for the particle preform is $H_2O$. When doping essentially dry particle preform, the doping atmosphere may be adjusted to have the desired $D_2O$ and $H_2O$ partial pressures to obtain the desired [OD] and [OH] concentration in the final glass. When doping particle preforms comprising OH at a certain level with OD, the particle preform may be treated in a doping atmosphere comprising a D-containing compound, such as an OD-containing compound, such as $D_2O$, for a sufficient time, such that a desirable amount of OH in the particle preform is exchanged by OD. By controlling the partial pressure ratio of the OD-containing and OH-containing compounds in the doping atmosphere, doping temperature and doping time, glass with desired levels of [OD] and [OH] can be obtained in this manner as well. It is not ruled out that the particle preform may comprise certain amount of OD before step (C), and in step (C), it is doped or exchanged with OH only to achieve the desired [OD] and [OH] concentrations in the final glass.

It is known that when particle preforms comprising silica is treated in a reductive atmosphere at an elevated temperature such as in steps (B) and/or (C), oxygen-deficient defects in the glass may be generated. Such defects are particularly detrimental for transmission properties in deep UV and vacuum UV, such as at 248 nm and 193 nm. Therefore, after steps (B) and (C), it is highly desirable that the particle preform is treated in an oxidative atmosphere in a step (C(A)). The oxidation agent in the oxidative atmosphere may be, for example, $O_2$, $O_3$, $D_2O$, $H_2O$, and the like.

In step (D) of the process of the present invention, the particle preform is consolidated into densified silica glass. Steps (C) and (D) may be carried out at least partially simultaneously, meaning that, at least part of the doping is carried out while the particle preform is consolidated into densified glass. Step (C(A)) described above and step (D) may be carried out at least partly simultaneously, meaning that, at least in part of step (D), at least part of the oxygen-deficient defects in the glass is oxidized and healed. In step (D), the particle preform is heated to an elevated temperature, desirably higher than 1000° C., in certain embodiments higher than 1200° C., in certain embodiments higher than 1400° C., where the particles are sintered into densified glass. Temperature elevation rate during consolidation step (D) may be controlled in a manner such that a homogeneous distribution of dopants such as OH, OD, F and the like is achieved. Step (D) may be conducted in a consolidation atmosphere comprising inert gas such as He, Ar, $N_2$, and the like. The consolidation atmosphere may further comprise $O_2$ and/or $D_2O$ and/or $H_2O$ at a desired level. The $O_2$, $D_2O$ and/or $H_2O$ can function to oxidize and heal the oxygen-deficient sites in the glass.

Step (E) of this process of the present invention involves hydrogen doping the consolidated glass with a hydrogen doping atmosphere comprising molecular $H_2$, HD and/or $D_2$. The hydrogen doping atmosphere may comprise essentially no $D_2$ and HD even for glasses doped with high percentages of OD, especially if the hydrogen loading temperature is relatively low, such as below 500° C. In certain embodiments it is desired that for glasses doped with high percentage of OD, the hydrogen doping atmosphere is essentially devoid of HD and $H_2$ where the hydrogen doping temperature is higher than 500° C. Nonetheless, it has been found that where the silica glass is loaded at a temperature below 500° C., the loading of $H_2$ or $D_2$ does not appreciably alter the [OH] and [OD] in the glass. The hydrogen doping may be advantageously carried out at a temperature below 600° C. (cold loading), or to expedite the process, at a temperature above 600° C. (hot loading). However, it is usually conducted at a temperature below 1000° C. Due to the laws of diffusion, to reach the same loaded hydrogen level in the glass, cold loading tends to take longer time. Nonetheless, cold loading is preferred for the production of certain silica glass, especially those with relatively low water (e.g., [OD]+[OH]<100 ppm) for use in refractive lens elements in deep UV and vacuum UV lithographic devices, because it tends to generate less defects in the consolidated glass.

As mentioned supra, it was stated in the copending, co-assigned patent application Ser. No. 11/241,075 (filed on Sep. 30, 2005 and entitled "SYNTHETIC SILICA HAVING LOW POLARIZATION-INDUCED BIREFRINGENCE, METHOD OF MAKING SAME AND LITHOGRAPHIC DEVICE COMPRISING SAME," now published as United States Patent Application Publication No. 2006-0137399 A1, the relevant part thereof is incorporated herein by reference) that non-F-doped silica glass tends to have worse polarization-induced birefringence performance at higher [OH]. It was also stated in this patent application that the amount of polarization-induced birefringence was approximately proportional to the [OH] in an OH-doped silica glass. In another co-pending, co-assigned patent application Ser. No. 11/261,005 (filed on Oct. 26, 2005 and entitled "SYNTHETIC SILICA WITH LOW FLUENCE-DEPENDENT-TRANSMISSION AND METHOD OF MAKING THE SAME," the relevant portion thereof is incorporated herein by reference), it was found that for non-F-doped high purity synthetic silica glass, from the standpoint of fluence-dependent-transmission ("FDT") and LIWFD, it is preferable that for those with [OH]≦160 ppm, $H_2$ loading should be conducted at lower than 600° C. It was shown that hot loading can cause deterioration in FDT and LIWFD in such OH-doped silica glass with [OH]≦160 ppm. Yet, it was also shown that for those with [OH]≧500 ppm, hot loading does not alter the FDT and LIWFD performance more appreciably than cold loading.

Another method of making the F-doped synthetic silica glass of the present invention includes the following steps:
(a) providing a plurality of F-doped particles comprising silica; and
(b) melting the particles at an elevated temperature to obtain a transparent glass.

Step (a) in this process may comprise the following steps:
(a1) generating a plurality of particles comprising silica;
(a2) optionally purifying and/or drying the particles;
(a3) optionally doping the particles in an atmosphere comprising at least one F-containing compound; and
(a4) optionally treating the particles in an oxidative atmosphere to at least partly heal oxygen-deficient sites in the particles.
wherein at least in one of steps (a1), (a2), (a3) and (a4), F moieties are introduced into the particles.

In step (a1), the particles comprising silica may be generated by flame hydrolysis or sol-gel processes as described above in connection with the particle-to-glass process wherein the particle preforms are finally consolidated instead of melted to form the glass.

In step (a2), the purifying and/or drying may be carried out mutatis mutandis as described above in connection with the particle-to-glass process wherein the particle preforms are finally consolidated instead of melted to form the glass. Low level of metal impurities can be obtained via high purity starting materials and apparatus for making the soot (and corresponding consolidated glass) and/or purifying the soot (and apparatus used to consolidate the soot) with, e.g., $Cl_2$ or $Cl_2$+CO, to remove trace metals.

In step (a3), the doping may be carried out mutatis mutandis as described above in connection with the particle-to-glass process wherein the particle preforms are finally consolidated instead of melted to form the glass.

In step (a4), the treatment may be carried out mutatis mutandis as described above in connection with the particle-to-glass process wherein the particle preforms are finally consolidated instead of melted to form the glass.

In step (b), the glass is heated to a temperature where the glass is melted, such as at a temperature higher than 1500° C., in certain embodiments above 1800° C., in certain embodiments 2000° C. The melted glass may be further homogenized when melted in order to obtain a high homogeneity of composition and property in the final glass. Where homogenization is carried out, the glass particles melted may have essentially the same composition or differing compositions. For example, the particles may be an admixture of particles having differing [F]. Upon homogenization, the final glass obtained has a uniform [F].

Homogenization of consolidated glass can be carried out as well. Thus the consolidated F-doped synthetic silica glass of the present invention or mixtures thereof, irrespective of the method of making, may be heated to an elevated temperature, such as above 1500° C., in certain embodiments above 1800° C., where they are melted and homogenized to form a glass with uniform composition and properties.

Upon homogenization, the final, cooled, consolidated glass may be annealed and/or further doped with molecular hydrogen as described above in connection with the particle-to-glass process wherein the particle preforms are finally consolidated instead of melted to form the glass, mutatis mutandis.

The synthetic silica glass material of the present invention can be further processed into optical members for use in the light path of lithographic irradiation of a lithographic device operating at a wavelength of below 300 nm, such as 248 nm, 193 nm and even shorter. The optical member may take various geometry and size. The optical member may be used in low-fluence or high-fluence irradiation paths. Thus a process for making optical member based on the silica glass of the present invention can be a combination of the processes of the present invention for making the glass material and additional steps of processing the glass material of the present invention.

The following non-limiting examples further illustrate the present invention.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

It has been reported that the level of PIB produced in a silica glass by exposure to linearly polarized ArF radiation is related to its OH concentration. As the OH concentration decreases, PIB decreases. See U. Neukirch, D. C. Allan, N. F. Borrelli, C. E. Heckle, M. Mlejnek, J. Moll, C. M. Smith, "Laser-Induced Birefringence in Fused Silica from Polarized Lasers," Proc. SPIE 5754, 638-645 (2005). Recently, Smith has shown that the same trend holds for linearly polarized $F_2$ (157 nm) excimer laser irradiation. PIB development is faster with the $F_2$ laser exposure and much higher levels of PIB can be produced in a shorter exposure time, making it a useful screening tool. IR studies using polarized exposure and polarized IR measurements show the correspondence of PIB with differential bleaching of the OH in the glass. The conclusion from these results is that PIB can be minimized (or possibly eliminated) by minimizing (or eliminating) OH from the silica. See C. M. Smith, N. F. Borrelli, J. E. Tingley, "Polarized IR Studies of Silica Glasses Exposed to Polarized Excimer Radiation," J. Opt. Soc. Am. B 23, 2511-2517 (2006). However, it has been reported that silica containing very low OH (1-20 ppm by weight, "ppmwt") actually developed more PIB than higher OH (60-100 ppm) silica when exposed to linearly polarized ArF laser radiation when the glasses contained 'halogens" residual from the glass forming process. B. Kuhn, S. Kaiser, I. Radosevic, B. Uebbing, S. Thomas, "Synthetic Fused Silica Tailored for 193 nm Immersion Lithography," presented at the Sematech 2nd International Symposium on Immersion Lithography, Sep. 12-15, 2005, Bruges, Belgium. Halogens (e.g., Cl, F, etc.) are incorporated into the glass structure during the soot-to-glass sintering (consolidation) process when a halogenated gas is used as a drying agent. The most common drying agent is chlorine ($Cl_2$) although fluorinated gases (e.g., $CF_4$, $SiF_4$) are also effective. The authors do not explicitly say what halogens are associated with more PIB, that is, no distinction was made between F and Cl.

FIG. 1 shows polarization-induced birefringence (PIB) vs. exposure pulses in millions for different silica glasses exposed to linearly polarized $F_2$ excimer laser light. (Exposure conditions: ~0.25 mJ·cm$^{-2}$·pulse$^{-1}$. The dry (no OH), fluorine-doped silica did not develop any birefringence indicative of PIB over the course of the exposure. All of the other, OH-containing, glasses did exhibit such induced birefringence. The data show that fluorine in the glass does not contribute to PIB.

Figure 3:
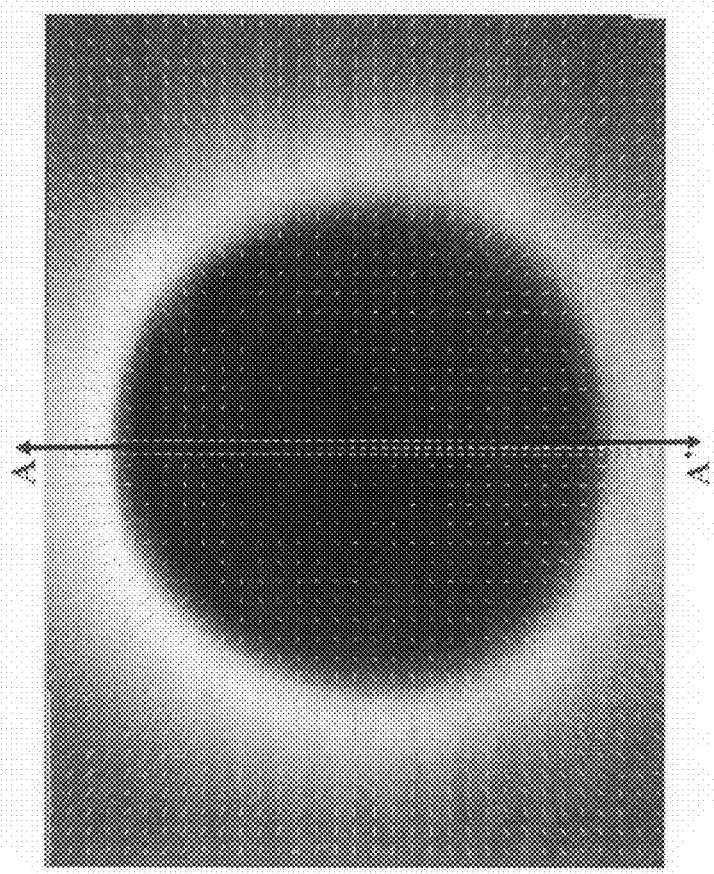
FIG. 3 is a birefringence map of a silica glass sample comprising 4000 ppm fluorine essentially free of OH and OD upon exposure to linearly polarized $F_2$ excimer laser light.
Figure 2:
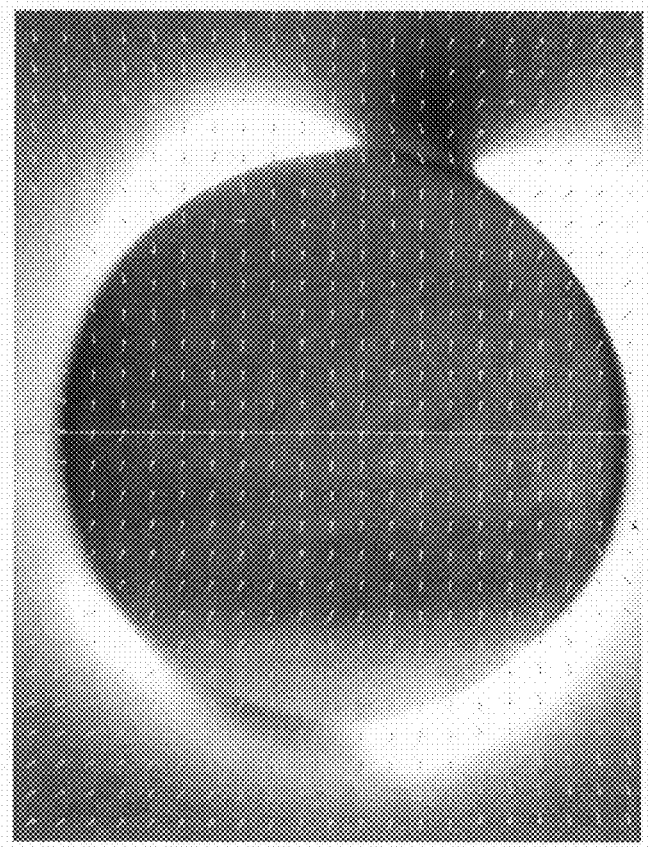
FIG. 2 is a birefringence map of a silica glass sample comprising 100 ppm OH essentially free of fluorine upon exposure to linearly polarized $F_2$ excimer laser light.
Figure 4:
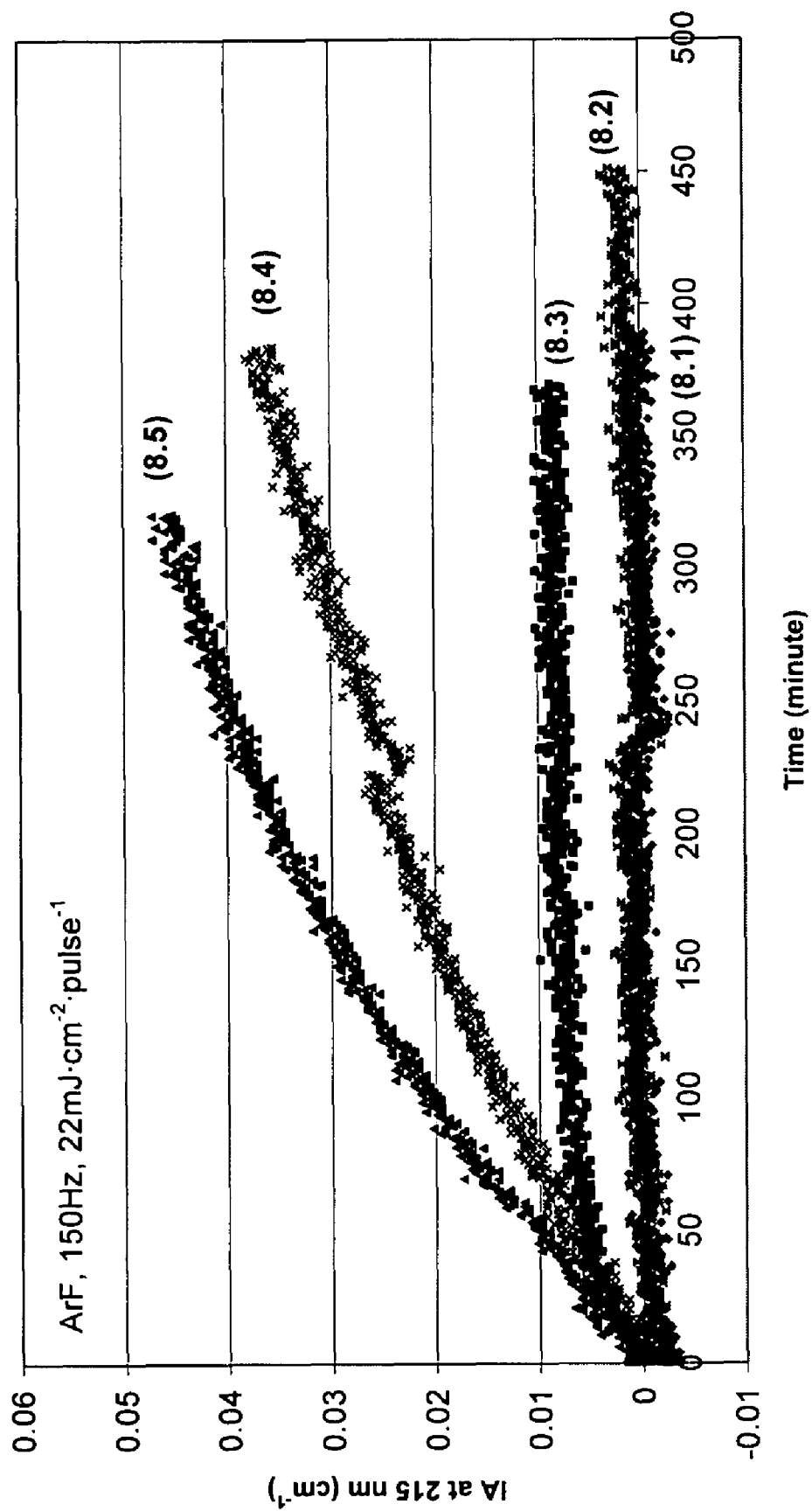
FIGS. 4-9 show the performance of a series of silica glass according to the present invention and according to certain comparative examples upon exposure to ArF excimer laser.
Figure 5:
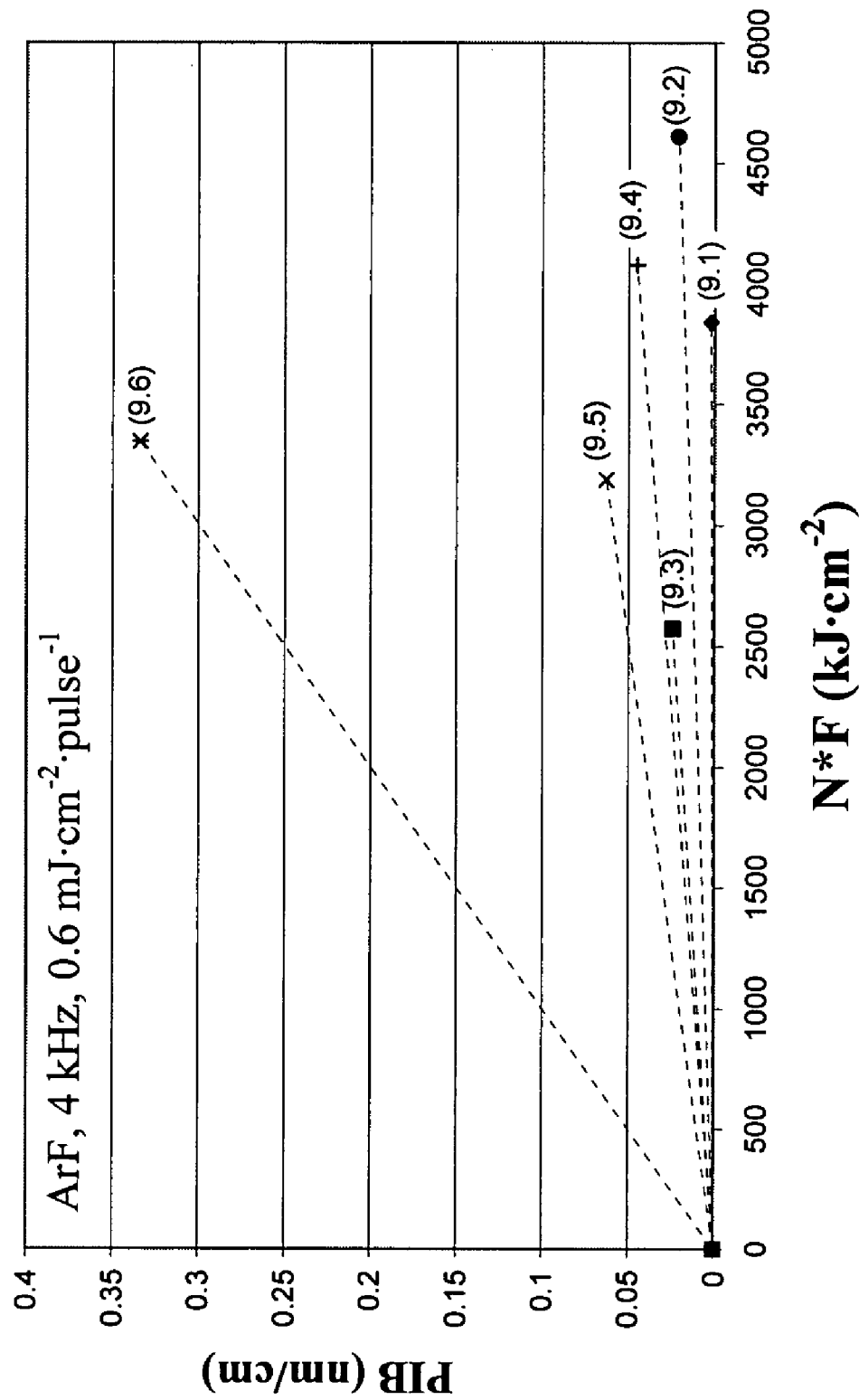
Figure 6:
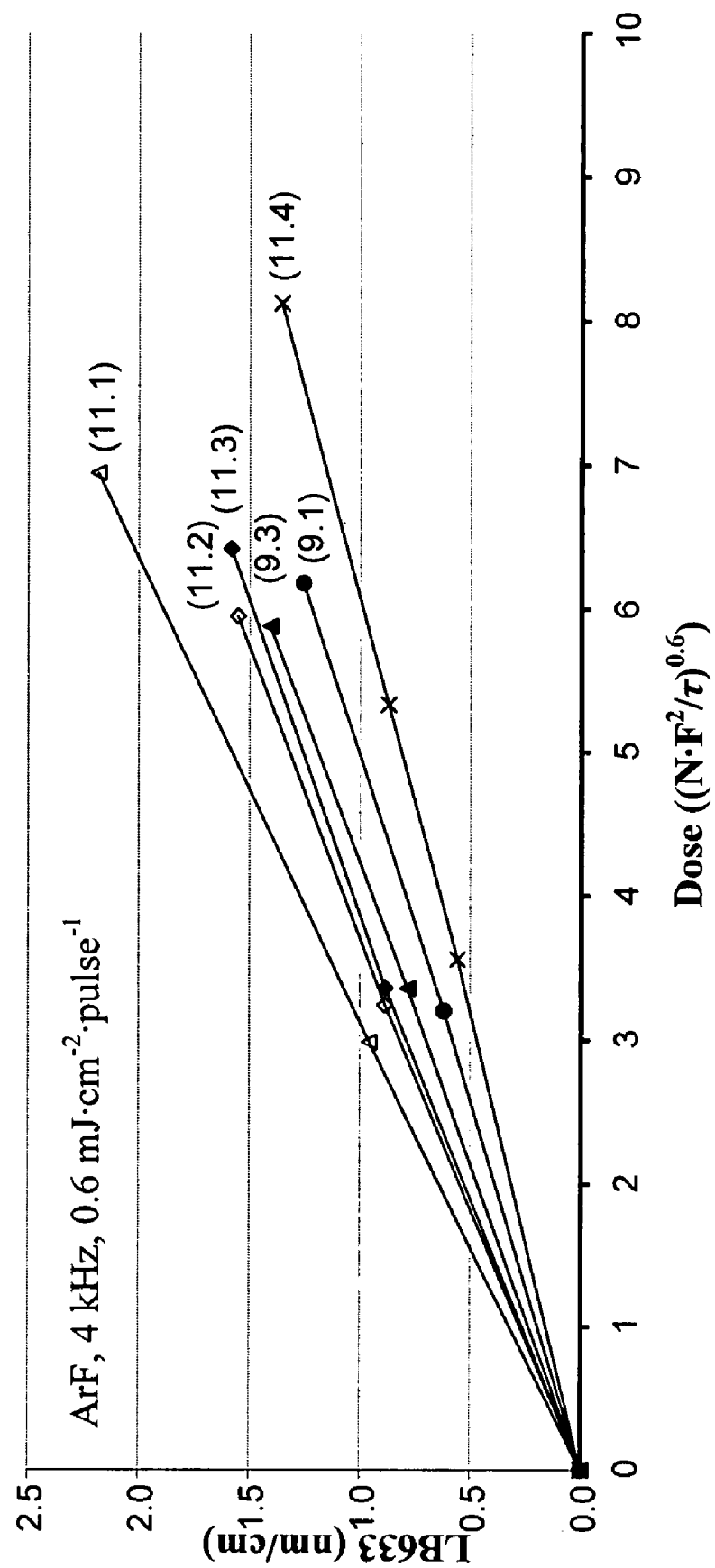
Figure 7:
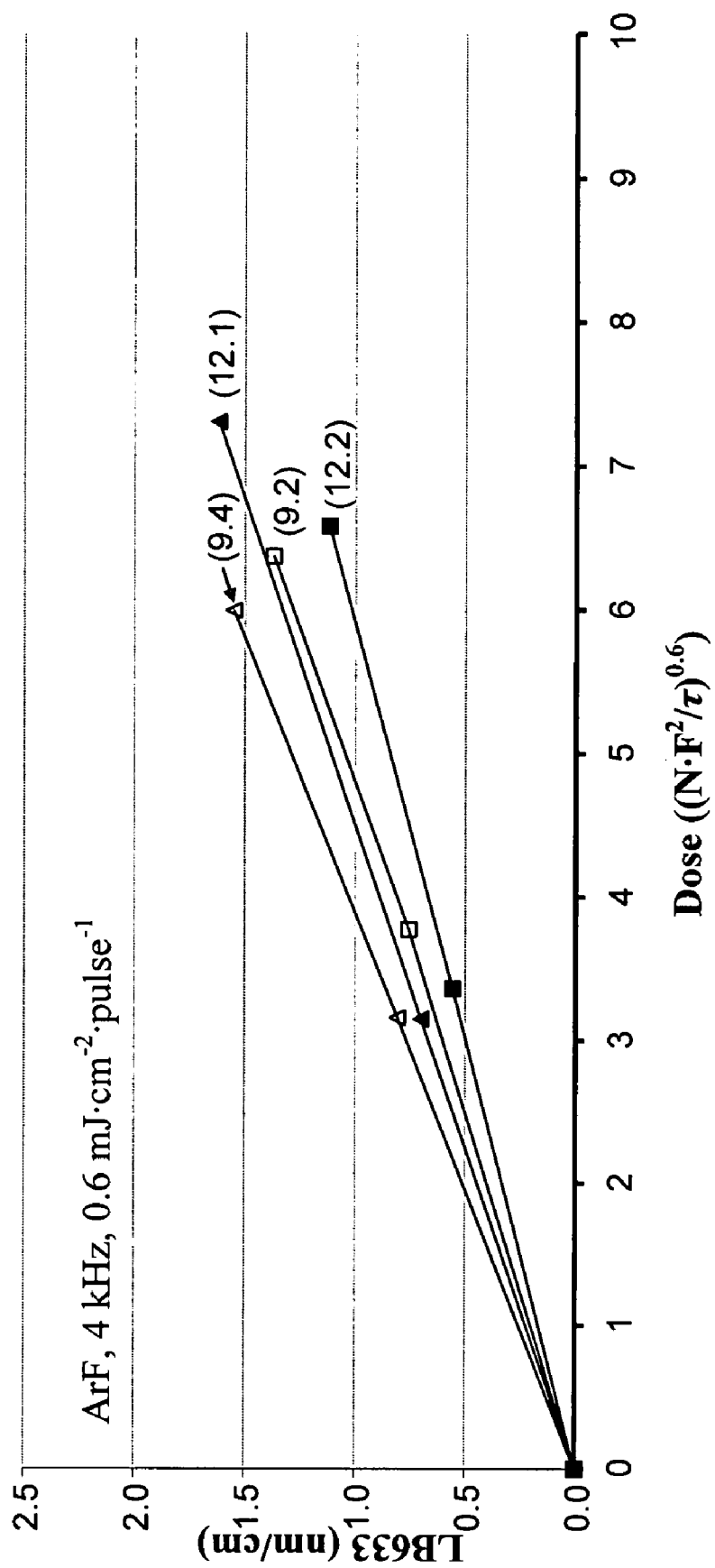
Figure 8:
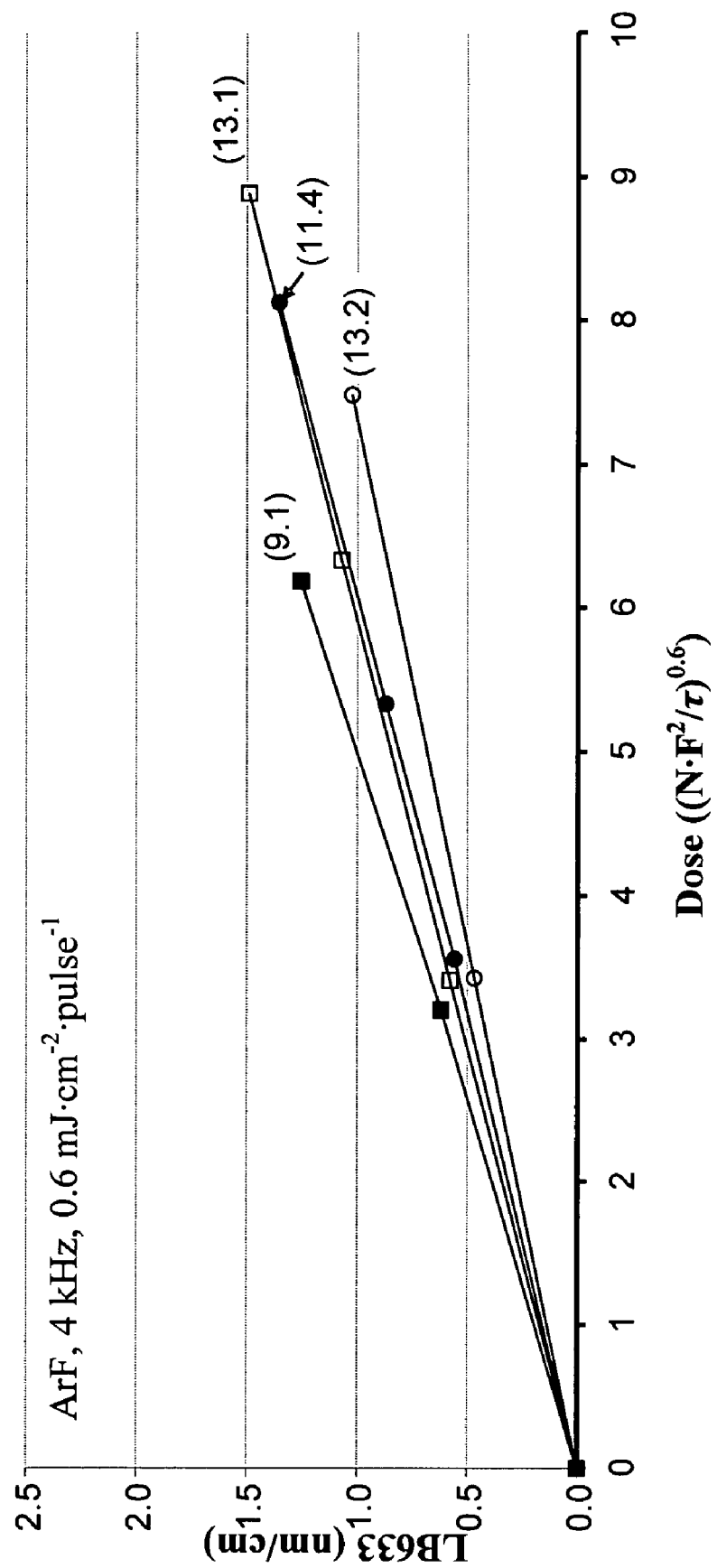
Figure 9:
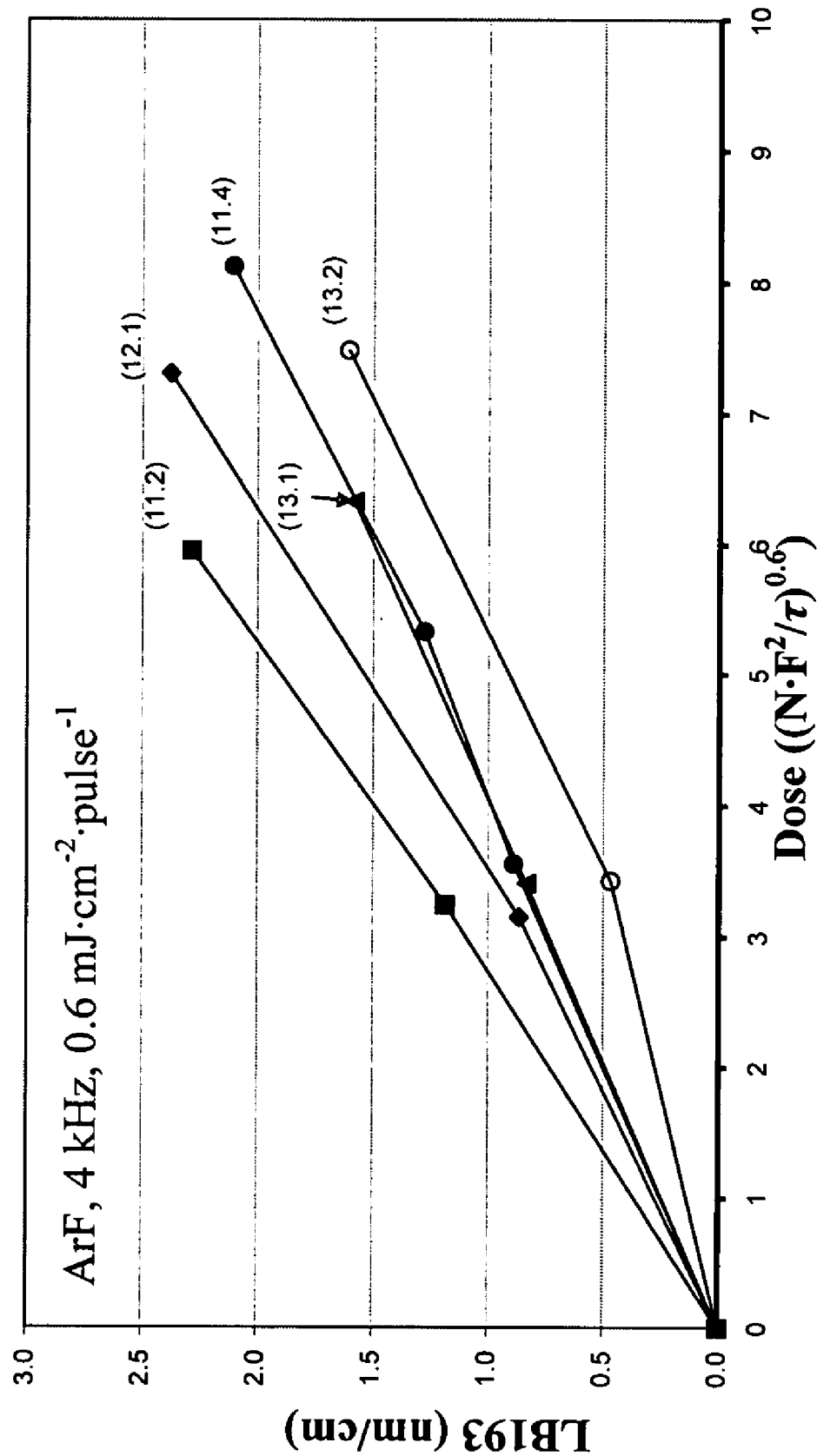

To illustrate how the above curves were obtained FIGS. 2 and 3 show the Polscope diagrams of the 100 ppm OH glass at 15E6 pulse with the F-doped glass described above at 9E6 pulses. The diagrams show the exposed areas of the glass; the exposure aperture is imaged as the round center. The PolScope evaluates the direction and slow axis of retardance and quantifies its magnitude. In a symmetrically exposed (circular aperture) sample, exposed with unpolarized light there should be zero birefringence within the exposed area. In the PolScope diagram that would be vectors of essentially zero magnitude within the exposed area. When the 100 ppm OH glass is exposed with linearly polarized light, shown in FIG. 2, however, PIB is observed and can be quantified according to the magnitude of birefringence within the aperture (non-zero vectors). This is compared to FIG. 3 for the F-containing silica that shows small vectors (low retardance magnitude) within the exposed area. As a side note, PIB has always been shown to evolve with its slow axis perpendicular to the incident polarization.

We have discovered a fluorine-doped silica glass which is completely free of OH does not exhibit PIB when exposed to linearly polarized $F_2$ laser radiation and, by extension, to linearly polarized ArF laser radiation.

$F_2$ laser experiments were run on various silica glasses. The test set comprised Corning glass code 7980 and several silica glasses made by the soot-to-glass process with different concentrations of OH. A fluorine-doped glass was also prepared by the soot-to-glass process. The consolidation process included an $SiF_4$ drying/doping step which yielded glass containing 4000 ppm F and completely free of OH groups. Samples were cut from the blanks and tested in the following manner. Samples were exposed to polarized 157-nm light at fluences of roughly 200-300 µJ·cm$^{-2}$·pulse$^{-1}$. Birefringence measurements were made using a PolScope instrument. FIG. 1 shows a plot of polarization-induced birefringence vs. exposure pulses for the various silica glasses. All of the glasses containing OH developed some level of polarization-induced birefringence during the course of exposure. In contrast, the dry, F-doped glass developed no PIB even though the sample contained a high level of fluorine. A trend of decreasing PIB with decreasing OH can be seen in the figure. We have discovered that when all of the OH is removed from the glass in such a manner as to dope the glass with fluorine atoms, a glass which exhibits no PIB can be achieved.

The same trend of decreasing PIB with decreasing OH concentration has been observed under ArF excimer laser radiation. The fact that the same trend is observed under the two different radiation sources suggests that the mechanism which produces PIB is the same in both cases. Thus the dry, F-doped silica is expected to resist PIB under linearly polarized ArF radiation as well.

The mechanism responsible for PIB is not completely understood, but at least two theories have been proposed. In one theory, OH groups in the glass are aligned by the polarized laser light leading to an anisotropic density change and PIB. Since halogens (F, Cl) form structurally similar groups as OH (i.e., $\equiv$Si—OH, $\equiv$Si—Cl, $\equiv$Si—F, where $\equiv$ indicates bonding to three network oxygen atoms), it has been suggested that halogens will also be aligned by linearly polarized light and contribute to PIB. B. Kuhn, S. Kaiser, I. Radosevic, B. Uebbing, S. Thomas, "Synthetic Fused Silica Tailored for 193 nm Immersion Lithography," presented at the Sematech 2nd International Symposium on Immersion Lithography, Sep. 12-15, 2005, Bruges, Belgium. In another theory, proposed by the present inventors and suggested by experiments, it is believed that PIB is related to the preferential bleaching of certain $\equiv$SiOH groups in the glass which are aligned with the polarization direction of the incident laser light. The fact that our OH-free, F-doped glass does not exhibit PIB shows that $\equiv$Si—F groups do not contribute to PIB consistent with this theory. Thus, as long as the silica is OH-free, a wide range of fluorine concentrations might be incorporated into the glass with no increase in PIB.

Silica glass is used extensively for optical elements for short wavelength applications. Perhaps the most demanding application for silica is microlithography, where not only are meeting "static" specifications required (initial transmission, residual stress birefringence, index homogeneity) but there are also limits on "dynamic" properties that are desired to be met. These dynamic properties are a direct consequence of irradiating the silica glass for prolonged periods of time with pulsed, high photon energy sources. Among the specific properties that undergo changes as a result of exposure to light are density (observed as a change in wavefront) and transmission. Transmission of silica can decrease with exposure to light although it is known that the presence of molecular $H_2$ in the glass can mitigate the process; it is observed that the darkening rate is decreased in $H_2$-containing silica, relative to non-$H_2$-containing glass. Schematically, the reactions that are involved in color center formation (transmission degradation) are shown in equations 1 and 2. In equation 1, the formation of the E' and non-bridging oxygen hole center (NBOHC) are depicted. The E' center is centered at 215 nm but has significant absorption at 193 nm, making this color center particularly deleterious for that lithography wavelength. The NBOHC is centered at 260 nm, with a significant tail at 248 nm, adversely impacting transmission at this other important lithography wavelength. In equation 2 is schematically depicted the reaction of molecular $H_2$ with the color centers just described. The formed SiH and SiOH moieties have substantially less absorption in the UV than the unhydrated E' and NBOHC centers. The actual mechanism of protection against transmission degradation is substantially more complicated than what is depicted in equations 1 and 2, however the presence of $H_2$ is critical in decreasing the darkening rate of the glass.

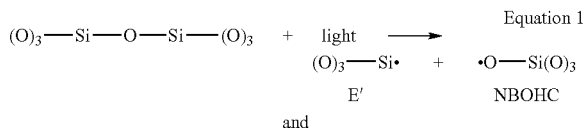

Equation 1

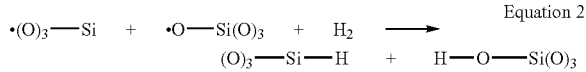

Equation 2

The products shown in equation 2 are susceptible to cleavage with light. Their number density at any time is a function of $H_2$ concentration, exposure fluence, pulse count and how many E' were formed and reacted with $H_2$. This type of absorption process relies on the lattice cleaving (equation 1) and is thus a relatively inefficient process, taking many millions or billions of pulses at fluences in the range of 1 mJ or less before significant absorption is observed.

The incorporation of $H_2$ as the molecular species can be problematic in that the silica glass lattice can react thermally with the $H_2$ to yield reactive products; one of the products has been described and referred to as SiH*. (It is noted that the loading conditions that yield SiH* formation, may also yield oxygen-deficient center (ODC) formation. The ODCs are described as silicon-silicon bonds (($O)_3$—Si—Si($O)_3$) in the glass structure, formed most favorably under reducing conditions. They have many of the dynamic responses that will be described for the SiH* species.

SiH* is photolabile (as the SiH above) and so can generate absorption (E' center formation) under irradiation. The amount that is formed depends on the initial OH of the glass, the temperature at which the glass is loaded, the $H_2$ concentration that is used for loading and loading time. The upshot of having SiH* in the glass is that it is an "immediate" precursor to E' center formation, that is, in contrast to the scheme outlined above that takes millions or billions of pulses to generate absorption, this mechanism produces absorption in very few pulses. While the lattice cleavage mechanism described previously is relatively slow, cleavage of the SiH* quickly leads to induced absorption. Depending on the amount of SiH* formed and subsequently photolyzed, this process can lead to undesirable transmission degradation and transmission excursions with exposure. In general, SiH* formation is increased by low initial OH content of the glass, higher loading temperatures, longer loading times and higher ambient $H_2$ concentration. Lower loading temperatures are then desirable in order to incorporate molecular $H_2$ while minimizing reduced defects, but are often prohibitive in terms of time, particularly for loading large parts (>1 cm thickness, for example).

Additional sample materials according to the present invention were prepared and tested for the performance. The compositions and properties of these materials along with a series of comparative examples are listed in TABLE I, below. Performance curves are shown in FIGS. 4-9, respectively. In these figures, where applicable, LIWFD (including LB193 and LB633) are plotted against dose $$\left(N' \cdot \frac{F^2}{\tau}\right)^{0.6},$$

where N' is number of pulses in millions of the linearly polarized ArF excimer laser to which the sample was exposed to when the LB633 or LB193 is measured, F is the fluence of the ArF excimer laser in mJ·cm$^{-2}$·pulse$^{-1}$, and $\tau$ is pulse length of the ArF excimer laser in ns. In these figures, N stands for pulse counts in millions, and F stands for fluence in mJ·cm$^{-2}$·pulse$^{-1}$.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I*

| Ex No. | CEx No. | TLH$_2$ (°C.) | F (ppm) | OH (ppm) | OD (ppm) | Cl (ppm) | [H$_2$] (1E17/cm$^3$) | Na (ppb) | [Na] + [K] + [Li] (ppb) | TM (ppb) | Tf (°C.) | Ti193 (%/cm) | T157 (%/cm) |
|---|---|---|---|---|---|---|---|---|---|---|---|---|---|
|  | 1.1 | none | 0 | 1200 | 0 | BDL | BDL |  |  |  |  |  |  |
|  | 1.2 | none | 0 | 550 | 0 | BDL | BDL |  |  |  |  |  |  |
|  | 1.3 | none | 0 | 100 | 0 | BDL | BDL |  |  |  |  |  |  |
|  | 1.4 | none | 0 | 80 | 0 | BDL | BDL |  |  |  |  |  |  |
| 1.5 |  | none | 4000 | BDL | 0 | BDL | BDL |  |  |  |  |  |  |
| 8.1 |  | none | 5000 | BDL | BDL | BDL | BDL | 1.8 | <7 | <15 |  |  | 74.7 |
| 8.2 |  | 350 | 5000 | BDL | BDL | BDL | 1.6 | 1.8 | <7 | <15 |  |  |  |
| 8.3 |  | none | 500 | 1 | BDL | BDL | BDL | <0.1 | <0.5 | <1.5 |  |  | 70.1 |
|  | 8.4 | none | 0 | BDL | BDL | 350 | BDL |  |  |  |  |  | 11.5 |
|  | 8.5 | none | 0 | 80 | BDL | BDL | BDL |  |  |  |  |  | 6.4 |
| 9.1 |  | 425 | 600 | 1 | BDL | BDL | 1.1 | <0.1 | <0.5 | <1.5 |  |  |  |
| 9.2 |  | 425 | 200 | BDL | 19 | BDL | 0.6 | 0.6 | 0.7 | <2 | 1087 | 99.80 |  |
| 9.3 |  | 425 | 200 | 19 | BDL | BDL | 0.8 | 0.1 | <0.5 | <0.5 | 1099 | 99.81 |  |
|  | 9.4 | 425 | 0 | BDL | 69 | BDL | 0.7 | 0.2 | <0.5 | <1.5 | 1126 | 99.80 |  |
|  | 9.5 | 425 | 0 | 14 | BDL | 10 | 0.6 |  |  |  | 1033 | 99.77 |  |
|  | 9.6 | 475 | 0 | 59 | BDL | BDL | 1.2 |  |  |  | 1066 | 99.82 |  |
|  | 11.1 | 425 | 0 | 53 | BDL | BDL | 0.9 |  |  |  | 1109 | 99.81 |  |
|  | 11.2 | 425 | 0 | 57 | BDL | BDL | 0.7 |  |  |  | 1029 | 99.82 |  |
|  | 11.3 | 425 | 0 | 11 | BDL | 10 | 0.5 |  |  |  | 1089 | 99.76 |  |
| 11.4 |  | 425 | 1000 | BDL | BDL | BDL | 0.5 | 2.4 | <3 | <2 | 1056 | 99.71 |  |
|  | 12.1 | 425 | 0 | BDL | 70 | BDL | 0.8 | 1.7 | <2.5 | <5 | 1032 | 99.80 |  |
| 12.2 |  | 425 | 200 | BDL | 19 | BDL | 0.5 | 0.6 | 0.7 | <2 | 1024 |  |  |
| 13.1 |  | 350 | 600 | 1 | BDL | BDL | 0.5 | <0.1 | <0.5 | <1.5 |  |  |  |
| 13.2 |  | 350 | 1000 | BDL | BDL | BDL | 0.4 | 2.4 | <3 | <2 | 1053 |  |  |

*
Ex: Example
CEx: Comparative Example
TLH2: H$_2$ Loading Temperature
TM: Transition Metals
BDL: Below Detection Limit
Ti193: Internal Transmission at 193 nm, with surface reflection loss correction
T157: Measured Transmission at 157 nm, without surface reflection loss correction

What is claimed is:
1. An F-doped synthetic silica glass material capable of being used in the light path of the lithographic irradiation of a lithographic device operating at a wavelength below 300 nm, comprising, by weight of the glass:
   from 0.01 to 150 ppm OD;
   less than 50 ppm of Cl;
   less than 50 ppb of Na;
   less than 50 ppb in total of transition metals; and
   from 0.1 ppm to 5000 ppm of fluorine; and
   having a polarization-induced birefringence of lower than 7 nm/mm, measured at 633 nm after being subjected to 10 million pulses of linearly polarized pulsed laser beam at 157 nm having a fluence of 250 $\mu J \cdot cm^{-2} \cdot pulse^{-1}$ and a pulse length of 30 ns.

2. A synthetic silica glass material according to claim 1, wherein the synthetic silica glass material is essentially free of OH.

3. A synthetic silica glass material according to claim 1, comprising from 1 to 100 ppm OD by weight of the glass.

4. A synthetic silica glass material according to claim 1, comprising less than 50 ppb in total of alkali metal by weight of the glass.

5. A synthetic silica glass material according to claim 1, comprising 1E16 to 2E17 molecules/cm$^3$ of hydrogen molecules.

6. A synthetic silica glass material according to claim 1, having an induced absorption, measured at 215 nm, of less than 0.1 cm$^{-1}$ after exposure to 3 million pulses of excimer laser at 193 nm at a fluence of 25 mJ·cm$^{-2}$·pulse$^{-1}$ and a pulse length of 30 ns.

7. A synthetic silica glass material according to claim 1, having an initial internal transmission at 193 nm of at least 99.50%/cm.

8. A synthetic silica glass material according to claim 1, having a transmission at 157 nm of at least 25%/cm.

9. A synthetic silica glass material according to claim 8, wherein the synthetic silica glass material is essentially free of OH and Cl.

10. A synthetic silica glass material according to claim 1, having an LIWFD, measured at 193 nm (LB193), from 0 to 2.5 nm/cm at a dose $$\left(N' \cdot \frac{F^2}{\tau}\right)^{0.6}$$

of 6, where N'=1375 is number of pulses in millions of the linearly polarized ArF excimer laser to which the sample was exposed to when the LB193 is measured, F=0.6 is the fluence of the ArF excimer laser in mJ·cm$^{-2}$·pulse$^{-1}$, and τ=25 is pulse length of the ArF excimer laser in ns.

11. A synthetic silica glass material according to claim 1, having a low polarization-induced birefringence at 193 nm.

12. A synthetic silica glass material according to claim 1, having a refractive index variation measured in a plane perpendicular to at least one direction of less than 10 ppm.

13. A synthetic silica glass material according to claim 1, further comprising OH and having a concentration variation of OH and OD ([OH]+[OD]) measured in a plane perpendicular to at least one direction of less than 100 ppm.

14. A synthetic silica glass material according to claim 1 having a concentration variation of F ([F]) measured in a plane perpendicular to at least one direction of less than 100 ppm.

15. A synthetic silica glass material according to claim 1, further comprising OH and having a concentration variation of fluorine, OH and OD ([OH]+[OD]+[F]) measured in a plane perpendicular to at least one direction of less than 100 ppm.

16. An optical member for use in the optical path of irradiation having a wavelength shorter than 300 nm, consisting essentially of an F-doped synthetic silica glass material capable of being used in the light path of the lithographic irradiation of a lithographic device operating at a wavelength below 300 nm, comprising, by weight of the glass:
   from 0.01 to 150 ppm OD;
   less than 50 ppm of Cl;
   less than 50 ppb of Na;
   less than 50 ppb in total of transition metals; and
   from 0.1 ppm to 5000 ppm of fluorine; and
   having a polarization-induced birefringence of lower than 7 nm/mm, measured at 633 nm after being subjected to 10 million pulses of linearly polarized pulsed laser beam at 157 nm having a fluence of 250 $\mu J \cdot cm^{-2} \cdot pulse^{-1}$ and a pulse length of 30 ns.

17. An optical member according to claim 16 for use in the optical path of irradiation having a wavelength shorter than 300 nm and a fluence over 0.5 mJ·cm$^{-2}$·pulse$^{-1}$.

18. A lithographic system comprising at least one optical member consisting essentially of an F-doped synthetic silica glass material capable of being used in the light path of the lithographic irradiation of a lithographic device operating at a wavelength below 300 nm, comprising, by weight of the glass:
   from 0.01 to 150 ppm OD;
   less than 50 ppm of Cl;
   less than 50 ppb of Na;
   less than 50 ppb in total of transition metals; and
   from 0.1 ppm to 5000 ppm of fluorine; and
   having a polarization-induced birefringence of lower than 7 nm/mm, measured at 633 nm after being subjected to 10 million pulses of linearly polarized pulsed laser beam at 157 nm having a fluence of 250 $\mu J \cdot cm^{-2} \cdot pulse^{-1}$ and a pulse length of 30 ns.

19. A lithographic system according to claim 18, which is a lithographic system operating at a wavelength of below 300 nm.

20. A lithographic system according to claim 19, which is an immersion lithographic system.

21. A process for making F-doped synthetic silica glass material capable of being used in the light path of the lithographic irradiation of a lithographic device operating at a wavelength below 300 nm, comprising the following steps:
   (A) providing a particle preform comprising a plurality of particles comprising silica;
   (B) optionally purifying and/or drying the particle preform;
   (C) optionally further doping the particle preform with dopants;
   (D) consolidating the particle preform at an elevated temperature to densified glass; and
   (E) optionally treating the consolidated glass obtained in step (D) in the presence of $H_2$, HD and/or $D_2$, wherein in at least one of steps (A), (B), (C) and (D), F is introduced or formed into the glass such that the resultant glass comprises F from 0.1 to 5000 ppm by weight of the glass, from 0.01 to 150 ppm OD, and wherein the glass comprises:
less than 50 ppm of Cl;
less than 50 ppb of Na;
and less than 50 ppb in total of transition metals.

22. A process according to claim 21, wherein the soot preform provided in step (A) comprises sodium lower than 50 ppb by weight.

23. A process according to claim 21, wherein step (A) comprises the following steps:
(A1) providing a plurality of particles; and
(A2) depositing the particles on a rotating supporting surface to form the particle preform.

24. A process according to claim 21, wherein at least one of steps (B), (C) and (D) is carried out in an atmosphere comprising F-containing compound.

* * * * *